US011858424B2

(12) United States Patent
Shin et al.

(10) Patent No.: US 11,858,424 B2
(45) Date of Patent: Jan. 2, 2024

(54) ELECTRONIC DEVICE FOR DISPLAYING IMAGE BY USING CAMERA MONITORING SYSTEM (CMS) SIDE DISPLAY MOUNTED IN VEHICLE, AND OPERATION METHOD THEREOF

(71) Applicant: Samsung Electronics Co., Ltd., Suwon-si (KR)

(72) Inventors: Seungwoo Shin, Suwon-si (KR); Hyewon Kim, Suwon-si (KR); Sanggun Lee, Suwon-si (KR); Yoonji Cho, Suwon-si (KR); Kyunglim Choi, Suwon-si (KR); Wooseok Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/951,623

(22) Filed: Sep. 23, 2022

(65) Prior Publication Data

US 2023/0012629 A1 Jan. 19, 2023

Related U.S. Application Data

(63) Continuation of application No. PCT/KR2021/003647, filed on Mar. 24, 2021.

(30) Foreign Application Priority Data

Mar. 26, 2020 (KR) .................. 10-2020-0037058

(51) Int. Cl.
*B60R 1/25* (2022.01)
*H04N 5/262* (2006.01)
(Continued)

(52) U.S. Cl.
CPC .................. *B60R 1/25* (2022.01); *B60R 1/27* (2022.01); *G06T 7/70* (2017.01); *G06V 20/588* (2022.01);
(Continued)

(58) Field of Classification Search
CPC ...... H04N 5/2628; H04N 5/268; H04N 7/181; H04N 23/90; G06V 20/56; G06V 20/588;
(Continued)

(56) References Cited

U.S. PATENT DOCUMENTS 10,116,873 B1 10/2018 Campbell
10,200,656 B2 2/2019 Lee et al.
(Continued)

FOREIGN PATENT DOCUMENTS

JP 2007-274377 A 10/2007
JP 2008-141578 A 6/2008
(Continued)

OTHER PUBLICATIONS

International Search Report dated Jun. 28, 2021, issued in International Patent Application No. PCT/KR2021/003647.

*Primary Examiner* — Deeprose Subedi
(74) *Attorney, Agent, or Firm* — Jefferson IP Law, LLP

(57) ABSTRACT

A method, performed by an electronic device installed in a vehicle, of switching a view of an image displayed on a camera monitoring system (CMS) side display, and an electronic device are provided. The disclosure includes an electronic device for displaying, on a camera monitoring system (CMS) side display, a first image representing a surrounding environment image, detecting a lane change signal of the vehicle, and, in response to the detected lane change signal, switching the first image displayed on the CMS side display to a second image representing a top view image showing locations of the vehicle and a surrounding (Continued)

vehicle in a virtual image as looking down from above the vehicle, and displaying the second image, and displaying a lane change user interface (UI) indicating information about whether a lane change is possible on the second image, and an operation method thereof.

13 Claims, 22 Drawing Sheets

(51) Int. Cl.
| | |
|---|---|
| G06V 20/56 | (2022.01) |
| G06V 20/59 | (2022.01) |
| H04N 5/247 | (2006.01) |
| G06T 7/70 | (2017.01) |
| H04N 23/90 | (2023.01) |
| G08G 1/04 | (2006.01) |
| G08G 1/052 | (2006.01) |
| G08G 1/16 | (2006.01) |
| H04N 5/268 | (2006.01) |
| H04N 7/18 | (2006.01) |
| B60R 1/27 | (2022.01) |
| B60R 1/26 | (2022.01) |
| B60R 11/04 | (2006.01) |
| B60R 11/00 | (2006.01) |

(52) U.S. Cl.
CPC ............ *G06V 20/597* (2022.01); *G08G 1/04* (2013.01); *G08G 1/052* (2013.01); *G08G 1/167* (2013.01); *H04N 5/268* (2013.01); *H04N 5/2628* (2013.01); *H04N 7/181* (2013.01); *H04N 23/90* (2023.01); *B60R 1/26* (2022.01); *B60R 11/04* (2013.01); *B60R 2011/0003* (2013.01); *B60R 2011/004* (2013.01); *B60R 2300/304* (2013.01); *B60R 2300/607* (2013.01); *B60R 2300/804* (2013.01); *G06T 2207/30201* (2013.01); *G06T 2207/30256* (2013.01); *G06T 2207/30268* (2013.01)

(58) Field of Classification Search
CPC ........ G06V 20/597; G06F 3/01; B60W 40/08; B60W 50/14; B60W 40/02; G06T 7/70; G06T 2207/30268; G06T 2207/30256; G06T 2207/30201; B60K 35/00; B60R 1/23; B60R 1/25; B60R 2300/304; B60R 1/26; B60R 2300/207; B60R 2300/607; B60R 11/04; B60R 2011/0003; B60R 2300/8066; B60R 2300/804; B60R 2011/004; B60R 2300/8046; G08G 1/04; G08G 1/052; G08G 1/167; G08G 1/056; G60Q 1/34

See application file for complete search history.

(56) References Cited

U.S. PATENT DOCUMENTS

| | | |
|---|---|---|
| 2008/0231703 A1 | 9/2008 | Nagata et al. |
| 2016/0137126 A1 | 5/2016 | Fursich et al. |
| 2016/0297362 A1 | 10/2016 | Tijerina et al. |
| 2018/0134217 A1* | 5/2018 | Peterson ................ G06V 20/58 |
| 2018/0201192 A1 | 7/2018 | Ishida |

FOREIGN PATENT DOCUMENTS

| | | |
|---|---|---|
| JP | 5681569 B2 | 3/2015 |
| JP | 2018-116516 A | 7/2018 |
| KR | 10-2017-0002330 A | 1/2017 |
| KR | 10-2017-0022508 A | 3/2017 |
| KR | 10-1752675 B1 | 6/2017 |

* cited by examiner

FIG. 11A
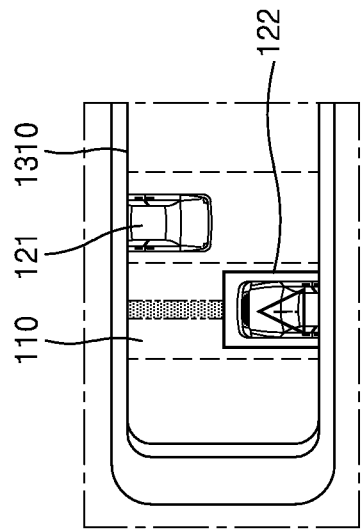
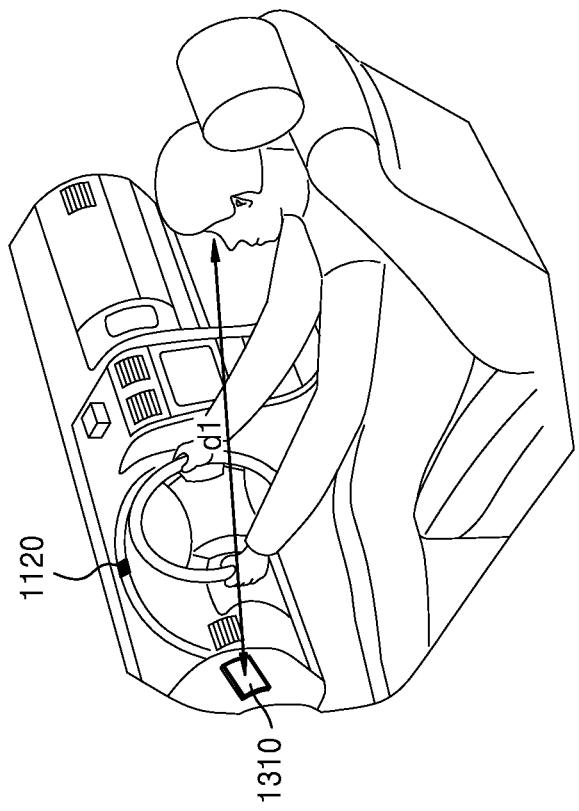

FIG. 11B
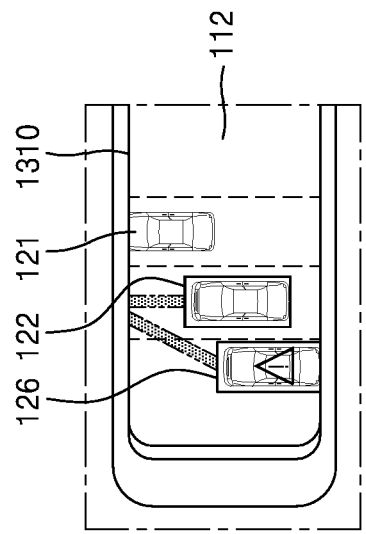
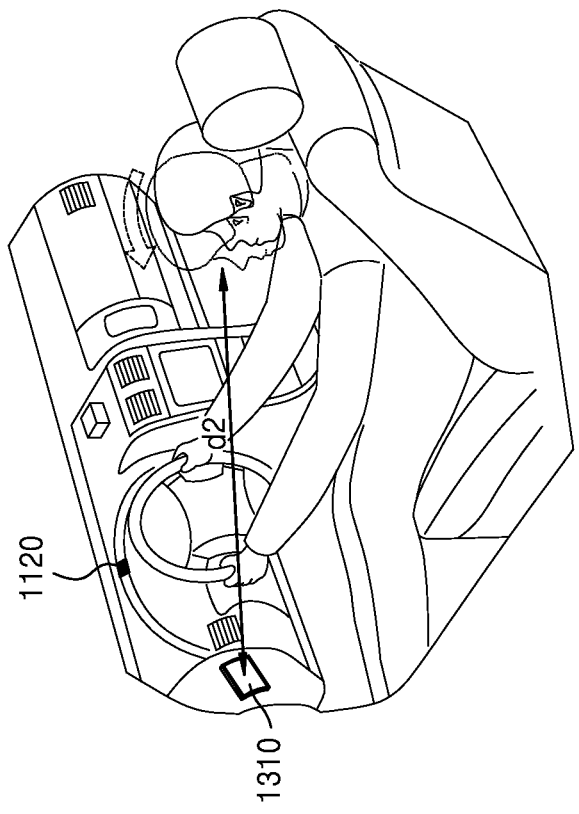

ELECTRONIC DEVICE FOR DISPLAYING IMAGE BY USING CAMERA MONITORING SYSTEM (CMS) SIDE DISPLAY MOUNTED IN VEHICLE, AND OPERATION METHOD THEREOF

CROSS-REFERENCE TO RELATED APPLICATION(S)

This application is a continuation application, claiming priority under § 365(c), of an International application No. PCT/KR2021/003647, filed on Mar. 24, 2021, which is based on and claims the benefit of a Korean patent application number 10-2020-0037058, filed on Mar. 26, 2020, in the Korean Intellectual Property Office, the disclosure of which is incorporated by reference herein in its entirety.

BACKGROUND

1. Field

The disclosure relates to a method, performed by an electronic device installed in a vehicle, of displaying a surrounding environment image captured by using an external camera of a camera monitoring system (CMS) on a CMS side display and switching a view of the surrounding environment image, and an electronic device.

2. Description of Related Art

Side view mirrors disposed on left and right sides of a vehicle each include a mirror and a housing and are used for changing lanes or checking surrounding situations such as surrounding vehicles and pedestrians. With the recent developments in the field of electronic devices installed in vehicles, the existing side view mirrors have been replaced with a camera monitoring system (CMS) including an external camera and a display.

The recently used CMS provides a user experience similar to that of the side view mirror including the existing mirror by displaying a surrounding environment image captured by using the external camera on a CMS side display as it is. In particular, because the CMS side display displays a surrounding environment image captured through a specific field of view (FoV), there is a limit to the FoV that a driver is unable to check with respect to a blind spot which may not be captured by the external camera, and a problem may arise as to the driver's judgment in a situation that may occur while driving, such as a lane change, a turn, and the like. Accordingly, a conscious and additional action is required for the driver to directly visually check an external environment outside a vehicle window.

The existing blind spot monitoring system (BSMS) of the related art merely provides a presence/absence notification function regarding whether there is a surrounding vehicle in a blind spot that may not be checked through a driver's FoV, and is limited for the driver to make a detailed driving judgement in a specific situation. For safe driving, it is necessary to clearly visually provide during driving information about changes in the surrounding environment to the driver.

In addition, the existing CMS side display requires a touch input or manipulation of a related button in order to determine information about the surrounding environment, but a touch or button manipulation action while driving may be a risk factor.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that detects a surrounding environment from a surrounding environment image captured through an external camera included in a camera monitoring system (CMS), switches a view of the surrounding environment image displayed on a CMS side display based on a change in the surrounding environment in a situation such as changing lanes or entering an intersection, obtains information about the surrounding environment, and displays a user interface (UI) related to a lane change, and an operation method thereof.

Additional aspects will be set forth in part in the description which follows and, in part, will be apparent from the description, or may be learned by practice of the presented embodiments.

In accordance with an aspect of the disclosure, a method, performed by an electronic device installed in a vehicle, of displaying an image by using a camera monitoring system (CMS) of the vehicle is provided. The method includes displaying, on a CMS side display, a first image that is a surrounding environment image obtained by capturing a left surrounding environment or a right surrounding environment of the vehicle by using an external camera disposed on a side surface of the vehicle, detecting a lane change signal of the vehicle, in response to the detected lane change signal, switching the first image displayed on the CMS side display to a second image that is a top view image showing locations of the vehicle and a surrounding vehicle in a virtual image as looking down from above the vehicle, and displaying the second image, and displaying a lane change user interface (UI) indicating information about whether a lane change is possible on the second image.

The detecting of the lane change signal may include detecting a user input for lighting a turn signal, by manipulating a turn signal lever of the vehicle.

The detecting of the lane change signal may include detecting a turn or lane change based on driving route information of a navigation system of the vehicle.

The displaying of the lane change UI indicating information about whether the lane change is possible may include displaying a UI related to driving environment information comprising at least one of a lane, a location of a surrounding vehicle, a relative speed between the vehicle and the surrounding vehicle, a distance between the vehicle and the surrounding vehicle, or an expected entry route of each of the vehicle and the surrounding vehicle detected from the surrounding environment image.

The displaying of the second image may include overlaying and displaying the surrounding environment image obtained through a CMS view camera on the top view image.

The method may further include detecting a lane departure that the vehicle departs from a first lane on which the vehicle is currently driving and enters a second lane which is a lane to be entered by a preset range, in response to the detected lane departure, switching the second image displayed on the CMS side display to a third image comprising only a top view image excluding the overlaid surrounding environment image, and displaying the third image on the CMS side display.

The method may further include obtaining an occupant image by using a camera mounted inside the vehicle, obtaining location information about an occupant comprising at least one of a head location, a head rotation direction, or a gaze direction of the occupant from the obtained occupant image, measuring a distance between the occupant and the CMS side display based on the obtained location information about the occupant, and zooming in or out a field of view (FoV) of the second image based on the measured distance.

The method may further include detecting a hand gesture input including at least one of a pinch in or out or a palm swipe of a vehicle occupant by using a hand gesture sensor mounted inside the vehicle, and zooming in or out the FoV of the second image based on the detected hand gesture input.

The displaying of the second image may include displaying the second image on the CMS side display and a center information display (CID) of the vehicle.

The method may further include detecting a direction of a turn signal lighted by a driver input, and the displaying of the second image may include displaying the second image on the CID based on the detected direction of the turn signal.

In accordance with another aspect of the disclosure, an electronic device configured to display an image using a camera monitoring system (CMS) of a vehicle including an external camera disposed on each of a left side surface and right side surface of an outside of the vehicle, and configured to capture a surrounding environment of the vehicle and to obtain a first image that is a surrounding environment image, a CMS side display disposed inside the vehicle and displaying the surrounding environment image, a memory storing a program comprising one or more instructions controlling the electronic device, and a processor configured to execute the one or more instructions of the program stored in the memory, detect a lane change signal of the vehicle, in response to the detected lane change signal, switch the first image displayed on the CMS side display to a second image that is a top view image showing locations of the vehicle and a surrounding vehicle in a virtual image as looking down from above the vehicle, and control the CMS side display to display the second image, and display a lane change user interface (UI) indicating information about whether a lane change is possible on the second image.

The processor may detect a user input for lighting a turn signal, by manipulating a turn signal lever of the vehicle, and switch the first image displayed on the CMS side display to the second image based on the user input.

The processor may display a UI related to driving environment information comprising at least one of a lane, a location of a surrounding vehicle, a relative speed between the vehicle and the surrounding vehicle, a distance between the vehicle and the surrounding vehicle, or an expected entry route of each of the vehicle and the surrounding vehicle detected from the surrounding environment image on the CMS side display.

The processor may control the CMS side display to overlay and display the surrounding environment image obtained through the external camera on the top view image.

The processor may detect a lane departure that the vehicle departs from a first lane on which the vehicle is currently driving and enters a second lane which is a lane to be entered by a preset range, in response to the detected lane departure, switch the second image displayed on the CMS side display to a third image comprising only a top view image excluding the overlaid surrounding environment image, and control the CMS side display to display the third image.

The electronic device may further include an internal camera mounted inside the vehicle and configured to obtain an occupant image by capturing an occupant, and the processor may to obtain location information about the occupant comprising at least one of a head location, a head rotation direction, or a gaze direction of the occupant from the occupant image, measure a distance between a driver and the CMS side display based on the obtained location information about the occupant, and zoom in or out a field of view (FoV) of the second image based on the measured distance.

The electronic device may further include a hand gesture sensor mounted inside the vehicle and configured to detect at least one of a pinch in or out or a palm swipe of a vehicle occupant, and the processor may detect a hand gesture input of the vehicle occupant through the hand gesture sensor and zoom in or out the FoV of the second image based on the detected hand gesture input.

The electronic device may further include a center information display (CID) disposed on a dashboard of the vehicle, and the processor may to display the second image on the CMS side display and the CID.

The processor may detect a direction of a turn signal lighted by a driver input, and control the CID to display the second image on the CID based on the detected direction of the turn signal.

Another embodiment of the disclosure provides a computer-readable recording medium recording thereon a program for execution on a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11A is a diagram illustrating an embodiment in which an electronic device of the disclosure changes a field of view (FoV) of an image displayed on a CMS side display based on a distance change between the CMS side display and a driver according to an embodiment of the disclosure;

FIG. 11B is a diagram illustrating an embodiment in which an electronic device of the disclosure changes a FoV of an image displayed on a CMS side display based on a distance change between the CMS side display and a driver according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms used herein including technical or scientific terms have the same meaning as those generally understood by those of ordinary skill in the art to which the specification belongs.

Throughout the disclosure, when a certain part "includes" a certain component, this indicates that the part may further include another component instead of excluding another component unless there is different disclosure. In addition, terms such as " . . . unit" and " . . . module" used in the specification refer to units that perform at least one function or operation, and the units may be implemented as hardware or software or as a combination of hardware and software.

The expression "configured to" used in the specification may be exchanged with, for example, "suitable for", "having the capacity to", "designed to", "adapted to", "made to", or "capable of" in accordance with circumstances. The term "configured to" does not necessarily indicate only "specifically designed to" in terms of hardware. Instead, in a certain circumstance, the expression "a system configured to" may indicate the system "capable of" together with another device or components. For example, "a processor configured to perform A, B, and C" may indicate an exclusive processor (e.g., an embedded processor) configured to perform a corresponding operation or a generic-purpose processor (e.g., a central processing unit (CPU) or an application processor) capable of performing corresponding operations by executing one or more software programs stored in a memory.

Figure 1:
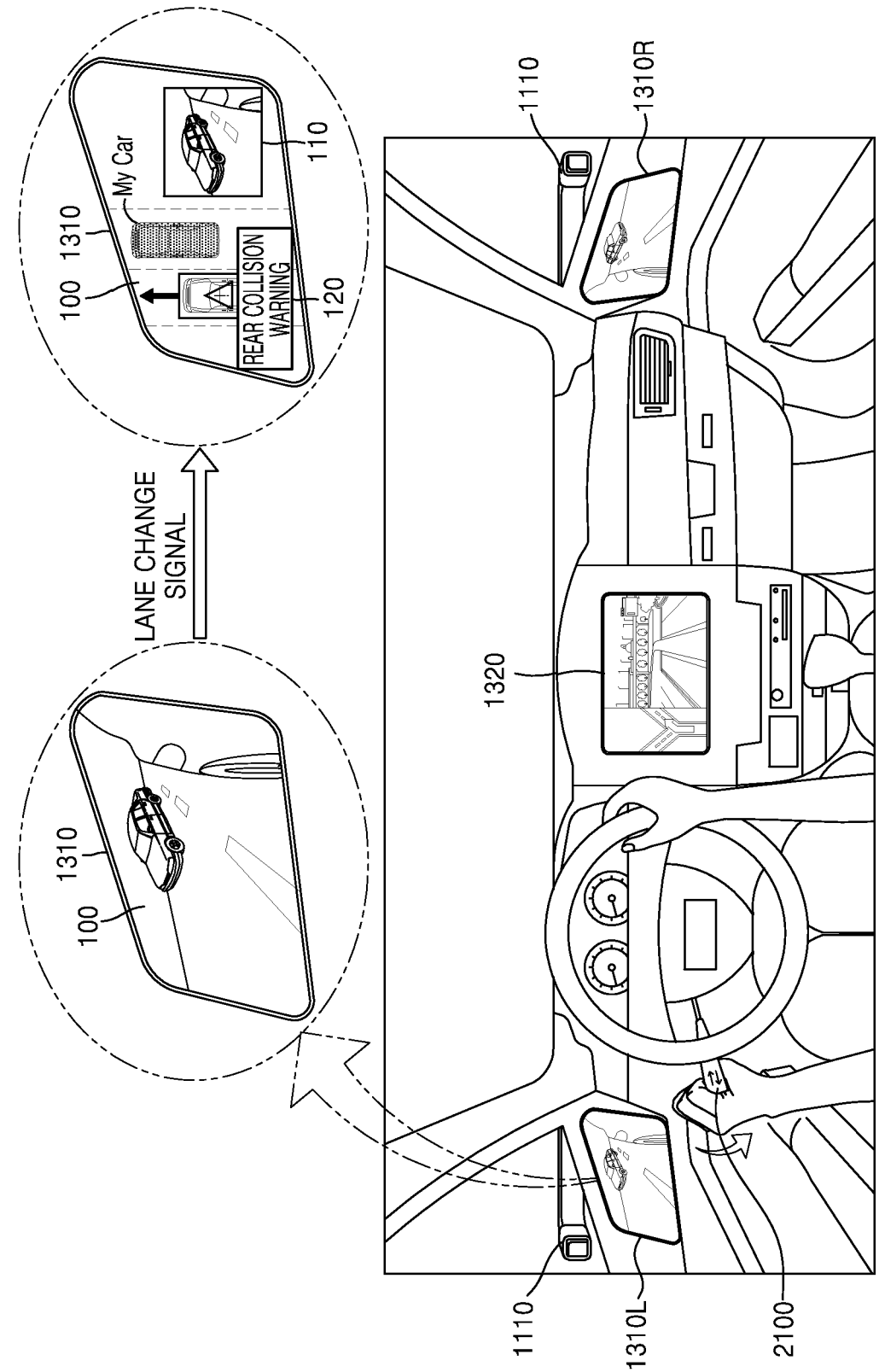
FIG. 1 is a conceptual diagram illustrating an operation of an electronic device including a camera monitoring system (CMS) installed in a vehicle according to an embodiment of the disclosure.

FIG. 1 is a conceptual diagram illustrating an operation of an electronic device including a camera monitoring system (CMS) installed in a vehicle according to an embodiment of the disclosure.

Figure 2:
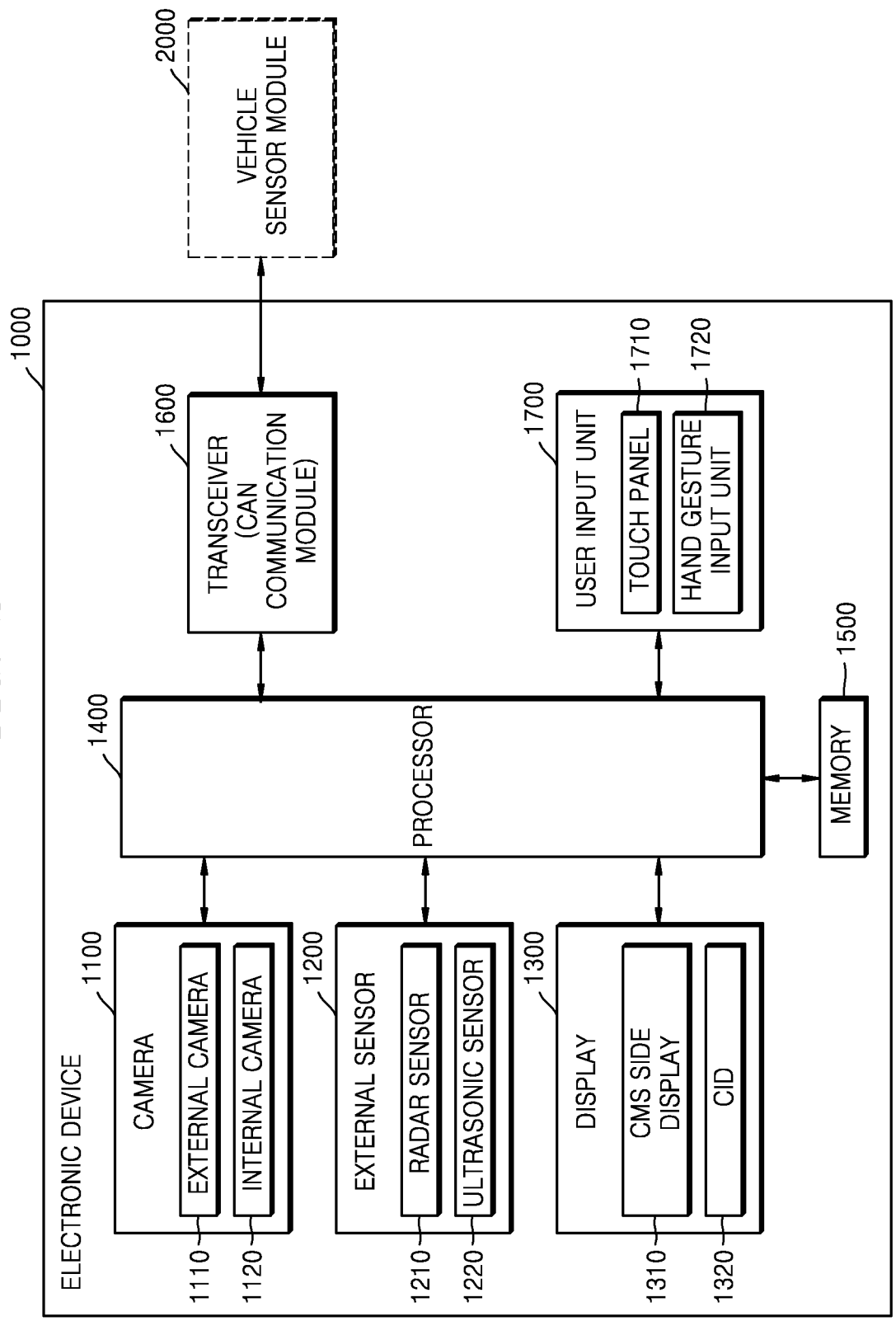
FIG. 2 is a block diagram illustrating a configuration of an electronic device according to an embodiment of the disclosure.

Referring to FIG. 1, an electronic device 1000 of FIG. 2 may include an external camera 1110 disposed outside of the vehicle, CMS side displays 1310L and 1310R, and a center information display (CID) 1320. In an embodiment, the external camera 1110 and the CMS side display 1310L and 1310R may constitute the CMS.

However, components included in the electronic device 1000 of FIG. 2 are not limited to those illustrated in FIG. 1. The components of the electronic device 1000 will be described in detail with reference to FIG. 2.

The external camera 1110 may be disposed on each of left and right sides of the outside of the vehicle. The external camera 1110 may obtain surrounding environment images by capturing surrounding environments of the left, right, and rear of the vehicle in real time. The external camera 1110 may capture a moving object including at least one of a surrounding vehicle, a two-wheeled vehicle, or a pedestrian located in the surrounding environments of the left, right, and rear of the vehicle.

The CMS side displays 1310L and 1310R may display a surrounding environment image 100 captured through the external camera 1110. The CMS side displays 1310L and 1310R may include the left CMS side display 1310L disposed on the left side of a steering wheel and the right CMS side display 1310R disposed on the right side of the steering wheel and disposed adjacent to a passenger seat. However, the CMS side displays 1310L and 1310R are not limited to the shapes and arrangements shown in FIG. 1. Another embodiment of the CMS side display 1310 of the disclosure will be described in detail with reference to FIGS. 5A, 5B, 5C, and 5D.

The electronic device 1000 of FIG. 2 may detect a lane change signal of the vehicle, and in response to the detected lane change signal, switch the surrounding environment image 100 displayed on the CMS side displays 1310L and 1310R to a top view image 110 and display the top view image 110. The top view image 110 means an image of a view showing the surrounding environment of the vehicle as looking down from above the vehicle by using a surround view monitoring (SVM) system installed in the vehicle. In yet another embodiment, the electronic device 1000 may switch the surrounding environment image 100 displayed on the CMS side displays 1310L and 1310R to the top view image 110 in response to the lane change signal, reduce the size of the surrounding environment image 100, and overlay and display the reduced surrounding environment image 100 on the top view image 110.

In yet another embodiment, the electronic device 1000 may detect a user input for activating (lighting) a left or right turn signal, by manipulating a turn signal lever 2100, and based on the detected user input, switch the surrounding environment image 100 displayed on the CMS side display 1310 to the top view image 110 based on the detected user input, and display the top view image 110. The electronic device 1000 may switch a view of an image displayed on one of the left CMS side display 1310L and the right CMS side display 1310R based on a direction of the lighted turn signal. For example, when a user input for lighting the left turn signal is received through an input of pressing the turn signal lever 2100 in a downward direction, the electronic device 1000 may switch the surrounding environment image 100 displayed on the left CMS side display 1310L to the top view image 110, and display the top view image 110. For another example, when a user input for lighting the right turn signal is received by manipulating the turn signal lever 2100 in an upward direction, the electronic device 1000 may switch the surrounding environment image 100 displayed on the right CMS side display 1310R to the top view image 110, and display the top view image 110.

In yet another embodiment, the electronic device 1000 may detect a turn signal or a lane change signal based on driving route information of a navigation system, may switch the surrounding environment image 100 displayed on the CMS side display 1310L or 1310R to the top view image 110 based on the detected turn signal or lane change signal, and may display the top view image 110. The driving route information of the navigation system may be displayed on the CID 1320.

The electronic device 1000 may display a lane change user interface (UI) 120 indicating information about whether the lane change is possible on the top view image 110. In yet another embodiment, the electronic device 1000 may obtain driving environment information including at least one of a lane, a location of a surrounding vehicle, a relative speed between own vehicle own vehicle and the surrounding vehicle, a distance between own vehicle and the surrounding vehicle, or an expected entry route of the surrounding vehicle from the surrounding environment image 100, and may determine a lane change possibility based on the obtained driving environment information. The electronic device 1000 of FIG. 2 may display the lane change UI 120 determined based on the driving environment information on the CMS side displays 1310L and 1310R. In yet another embodiment, the lane change UI 120 may overlay and display a warning mark on the surrounding vehicle of own vehicle or display a warning phrase (e.g., 'rear collision warning'). The lane change UI 120 will be described in detail with reference to FIG. 7A.

In yet another embodiment, the electronic device 1000 of FIG. 2 may output a warning sound when an unexpected situation occurs, such as when a surrounding vehicle suddenly increases the speed or when the surrounding vehicle abruptly changes lanes while driving.

The CMS side display of the related art provides a user experience similar to that of the existing side view mirror configured as a mirror, by displaying only the surrounding environment image 100 captured by using the external camera 1110. In particular, because the CMS side display of the related art displays only the surrounding environment image 100 captured through a specific field of view (FoV), there was a limit to the FoV that a driver is unable to check with respect to a blind spot which may not be captured by the external camera 1110, and there was a problem in that the driver has a difficulty in intuitively judging a situation in the situation that may occur while driving, such as a lane change, a turn, and the like. Accordingly, a conscious and additional action was required for the driver to directly visually check the external environment outside a vehicle window in a situation such as a lane change or a turn, and inconvenience existed.

In addition, the existing blind spot monitoring system (BSMS) of the related art merely provides a presence/absence notification function regarding whether there is a surrounding vehicle in a blind spot that may not be checked through a driver's FoV, and is limited for the driver to make a detailed driving judgement in a specific situation. For safe driving, it is necessary to clearly and visually provide information about a change in the surrounding environment while driving.

The electronic device 1000 of FIG. 2 of the disclosure may provide a user eXperience (UX) differentiated from the CMS side display of the related art, by detecting a signal indicating that the vehicle intends to change lanes, switching the surrounding environment image 100 displayed on the CMS side displays 1310L and 1310R to the top view image 110 based on the lane change signal, displaying the top view image 110, and displaying the lane change UI 120 indicating information about the lane change possibility on the top view image 110. In particular, on the top view image 110, the electronic device 1000 of the disclosure may intuitively provide relevant information to the driver in a lane change or turn situation and enhancing reliability and stability of driving, by displaying the lane change UI 120 indicating at least one of a lane, a location of the surrounding vehicle, a relative speed between own vehicle and the surrounding vehicle, a distance between own vehicle and the surrounding vehicle, or an expected entry route of the surrounding vehicle. In addition, when the vehicle is driven in an autonomous driving mode by using a pre-mounted autonomous driving system, the electronic device 1000 of FIG. 2 of the disclosure may allow the driver to predict the judgment and driving method of the vehicle, by displaying the lane change UI 120 including a UI regarding an expected entry route of own vehicle and surrounding vehicle on the CMS side displays 1310L and 1310R, and accordingly, secure reliability for autonomous driving.

FIG. 2 is a block diagram illustrating a configuration of an electronic device according to an embodiment of the disclosure.

In an embodiment of the disclosure, an electronic device 1000 may be a device installed in a vehicle and controls a CMS.

Referring to FIG. 2, the electronic device 1000 may include a camera 1100, an external sensor 1200, a display 1300, a processor 1400, a memory 1500, a transceiver 1600, and a user input unit 1700. The camera 1100, the external sensor 1200, the display 1300, the processor 1400, the memory 1500, the transceiver 1600, and the user input unit 1700 may be electrically and/or physically connected to each other. Components illustrated in FIG. 2 are only according to another embodiment of the disclosure, and the components included in the electronic device 1000 are not limited to those illustrated in FIG. 2. The electronic device 1000 may not include some of the components illustrated in FIG. 2, and may further include components which are not illustrated in FIG. 2.

The camera 1100 may include an external camera 1110 and an internal camera 1120. The camera 1100 may include an image sensor, such as a complementary metal-oxide semiconductor (CMOS), charge-coupled device (CCD), or active pixel sensor, and a lens such as at least one of a linear lens, a concave lens, a convex lens, a wide angle lens, or a fish eye lens. The camera 1100 may be analog or digital. In yet another embodiment, the camera 1100 may include an infrared illumination output device.

The external camera 1110 may be disposed on left and right sides of the outside of the vehicle. However, the disclosure is not limited thereto, and the external camera 1110 may be disposed not only on the left and right sides of the vehicle, but also on the front and rear surfaces of the vehicle. An arrangement of the external camera 1110 will be described in detail with reference to FIG. 4.

The external camera 1110 may be configured as a CMS view camera that captures a moving object including at least one of a surrounding vehicle, a two-wheeled vehicle, or a pedestrian located in a surrounding environment on the left and right sides and rear of the vehicle. The external camera 1110 may obtain a surrounding environment image, by capturing a surrounding environment image in real time, and may provide the obtained surrounding environment image to the processor 1400.

In yet another embodiment, the external camera 1110 may be configured as a fish eye lens camera. The fish eye lens camera means a camera equipped with a wide-angle lens of a capturing angle equal to or greater than 180°. Because the surrounding environment image captured by using the fish eye lens camera may have a distortion, the processor 1400 may correct the surrounding environment image obtained from the external camera 1110 to generate a wide image, and may control the surrounding environment image according to a steering angle of the vehicle or the speed of the vehicle to display the surrounding environment image on the CMS side display 1310. The external camera 1110 may be configured as the fish eye lens camera, thereby capturing a blind spot surrounding the vehicle and obtaining a surrounding environment image regarding the blind spot. The 'blind spot' means at least one region that a driver is unable to see because a driver's field of view is blocked by a structure of the vehicle. However, the external camera 1110 is not limited to the fish eye lens camera.

The internal camera 1120 may capture an occupant in the vehicle and obtain an image of the occupant in real time. In an embodiment, the internal camera 1120 may capture a driver's face or a passenger's face in a passenger seat, obtain an occupant image regarding the driver's face or the passenger's face, and provide the obtained occupant image to the processor 1400.

In yet another embodiment, the internal camera 1120 may be disposed on a specific region of the vehicle, for example, on an upper end of a dashboard, a room mirror, or a cluster. However, a location at which the internal camera 1120 is disposed is not limited to the above-described example.

In yet another embodiment, the internal camera 1120 may include an eye tracking sensor that captures occupant's pupils including the driver or the passenger in the passenger seat, and detects a movement of the pupils. In order for the internal camera 1120 to track the location and gaze of the occupant's pupils, an image analysis method or a contact lens method may be used. The image analysis method is an analysis technology that detects the movement of the occupant's pupils through analysis of the occupant image obtained in real time, and calculates a direction of the gaze with respect to a fixed location reflected on the cornea, and the contact lens method is an analysis technology that uses light reflected by a contact lens with an embedded mirror or a magnetic field of a contact lens embedded in a coil. The internal camera 1120 may obtain the occupant image and sense the direction of the gaze of the occupant. However, the technology used by the internal camera 1120 of the disclosure to sense the direction of the gaze of the occupant is not limited to the above-described technologies. In an embodiment, the internal camera 1120 may include an infrared (IR) sensor, and may use the IR sensor to track the location of the occupant's pupils and sense the direction of the gaze.

The external sensor 1200 may include a radar sensor 1210 and an ultrasonic sensor 1220. The radar sensor 1210 and the ultrasonic sensor 1220 may be disposed on the front and rear surfaces of the vehicle, respectively. The arrangement of the radar sensor 1210 and the ultrasonic sensor 1220 will be described in detail with reference to FIG. 4.

The radar sensor 1210 may generate an electromagnetic wave in a radio wave or microwave spectrum in order to detect a moving object around the vehicle, for example, a surrounding vehicle, a two-wheeled vehicle, a pedestrian, etc., and may include a transmission antenna that radiates the electromagnetic wave and a reception antenna that receives the electromagnetic wave. The transmission antenna may radiate the radio wave (pulsed or continuous), receive the radio wave reflected from the moving object by using the reception antenna, and provide information about at least one of the location, speed, or angle of the moving object to the processor 1400. The radar sensor 1210 may communicate with the processor 1400 using a wired, wireless, or waveguide method.

In yet another embodiment, the radar sensor 1210 may include a lidar that uses ultraviolet, visible, or near-infrared light of a laser.

The ultrasonic sensor 1220 may include at least one transducer that converts an electric signal into an ultrasonic signal and converts an ultrasonic echo signal reflected from the moving object into an electric signal. The ultrasonic sensor 1220 may transmit an ultrasonic signal to a moving object, including a surrounding vehicle, a two-wheeled vehicle, or a pedestrian, located around the vehicle, and may receive an ultrasonic echo signal reflected from the moving object. The ultrasonic sensor 1220 may provide the received ultrasonic echo signal to the processor 1400. The processor 1400 may obtain information about a location of the moving object and a distance between the moving object and own vehicle, by analyzing the ultrasonic echo signal. In an embodiment, the processor 1400 may use a method of measuring a time interval between a time at which an ultrasound wave is transmitted and a time at which the ultrasound echo signal is received, in order to measure the distance to the moving object, but is not limited thereto.

The display 1300 may include the CMS side display 1310 and the CID 1320. The display 1300 may be configured as a physical device including at least one of, for example, a liquid crystal display (LCD) display, a plasma display panel (PDP) display, an organic light emitting diode (OLED) display, a field emission display (FED), a light emitting diode (LED) display, a vacuum fluorescent display (VFD), a digital light processing (DLP) display, a flat panel display, a 3D display, or a transparent display, but is not limited thereto. In yet another embodiment, the display 1300 may be configured as a touch screen including a touch panel 1710 that detects a touch input of a user (e.g., a driver or a passenger).

The CMS side display 1310 may display a surrounding environment image captured through the external camera 1110. In yet another embodiment, the CMS side display 1310 may display a top view image which is an image showing the surrounding environment of the vehicle as looking down from above the vehicle by using a SVM system installed in the vehicle. The top view image may be a surround view image showing locations of own vehicle and the surrounding vehicle in a virtual image.

The external camera 1110 and the CMS side display 1310 may constitute a CMS. However, the disclosure is not limited thereto, and the CMS may include at least one component of the electronic device 1000.

The CMS side display 1310 may include the left CMS side display 1310L (see FIG. 1) disposed on the left side of a steering wheel and the right CMS side display 1310R (see FIG. 1) disposed on the right side of the steering wheel and disposed adjacent to the passenger seat, but is not limited thereto. In yet another embodiment, the CMS side display 1310 may be included in a cluster display of the vehicle, or may be combined with the CID 1320. Another embodiment of the CMS side display 1310 of the disclosure will be described in detail with reference to FIGS. 5A to 5D.

The CID 1320 may display a direction navigation to a destination or display vehicle-related information. In yet another embodiment, the CID 1320 may display image content, such as a movie, a game, etc. The CID 1320 may be disposed between a driver seat and a passenger seat on a dashboard of the vehicle.

In yet another embodiment, the CID 1320 may display the top view image under the control of the processor 1400. An embodiment in which the top view image is displayed on the CID 1320 will be described in detail with reference to FIGS. 13, 14A, and 14B.

The processor 1400 may execute one or more instructions of a program stored in the memory 1500. The processor 1400 may be configured as a hardware component that performs arithmetic, logic, input/output operations and signal processing. The processor 1400 may be configured as at least one of, for example, a central processing unit, a microprocessor, a graphic processing unit, Application Specific Integrated Circuits (ASICs), Digital Signal Processors (DSPs), Digital Signal Processors (DSPDs), Signal Processing Devices, Programmable Logic Devices (PLDs), or Field Programmable Gate Arrays (FPGAs), but is not limited thereto.

The memory 1500 may include, for example, a flash memory type memory, a hard disk type memory, a multimedia card micro type memory, a card type memory (e.g., SD or XD memory, etc.), non-volatile memory including at least one of read-only memory (ROM), electrically erasable programmable read-only memory (EEPROM), or programmable read-only memory (PROM), and volatile memory such as random access memory (RANI) or static random access memory (SRAM).

The memory 1500 may store instructions, data structures, and program codes readable by the processor 1400. In the following embodiment, the processor 1400 may be implemented by executing instructions or codes of a program stored in the memory 1500. For example, program command codes that detect a lane change signal of the vehicle, in response to the detected lane change signal, switch a surrounding environment image displayed on the CMS side display 1310 to a top view image, display the top view image, and display a lane change UI indicating information about whether a lane change is possible on the top view image may be stored in the memory 1500.

In yet another embodiment, the processor 1400 may use a configuration implemented as hardware and software included in at least one of a BSMS, a SVM, or a lane departure warning system (LDWS) installed in the vehicle.

In yet another embodiment, the processor 1400 and the memory 1500 may constitute a control unit.

The processor 1400 may detect the lane change signal of the vehicle, in response to the detected lane change signal, switch the surrounding environment image displayed on the CMS side display 1310 to the top view image, display the top view image, and display the lane change UI indicating the information about whether the lane change is possible on the top view image.

In yet another embodiment, the processor 1400 may detect a user input for activating (lighting) a turn signal, by manipulating the turn signal lever 2100 (see FIG. 1) of the vehicle, and based on the detected user input, and switch the surrounding environment image displayed on the CMS side display 1310 to the top view image based on the user input. The processor 1400 may obtain activation (lighting) information of the turn signal according to a user input for manipulating the turn signal lever 2100 from a vehicle sensor module 2000 through the transceiver 1600. In an embodiment, the processor 1400 may switch a view of an image displayed on any one of the CMS side display 1310L (see FIG. 1) disposed on the left and the CMS side display 1310R (see FIG. 1) disposed on the right based on a direction of the activated turn signal. For example, when a user input for lighting the left turn signal is received through an input of pressing the turn signal lever 2100 in a downward direction, the processor 1400 may receive activation information of the left turn signal from the transceiver 1600, switch the surrounding environment image displayed on the left CMS side display 1310L to the top view image, and display the top view image. For another example, when a user input for lighting the right turn signal is received by manipulating the turn signal lever 2100 in an upward direction, the processor 1400 may receive activation information of the right turn signal from the transceiver 1600, may switch the surrounding environment image displayed on the right CMS side display 1310R to the top view image, and may display the top view image.

In yet another embodiment, the processor 1400 may detect a turn signal or a lane change signal based on route information of a navigation system installed in the vehicle, switch the surrounding environment image displayed on the CMS side display 1310 to the top view image based on the detected turn signal or lane change signal, and display the top view image. When the vehicle is driven in an autonomous driving mode, the processor 1400 may obtain driving information such as a steering angle, a speed, and the like, from the vehicle sensor module 2000, and switch the view of the image displayed on the CMS side display 1310 based on the obtained driving information and the route information of the navigation system. For example, the processor 1400 may detect a situation in which the vehicle turns at a crossroad using the route information of the navigation system, and in a case in which change information of the steering angle is obtained from the vehicle sensor module 2000 in the situation, switch a surrounding environment image displayed on the CMS side display 1310 to a top view image.

In yet another embodiment, the processor 1400 may switch the surrounding environment image displayed on the CMS side display 1310 to the top view image in response to the lane change signal, reduce a frame size of the surrounding environment image, and overlay the surrounding environment image on the top view image. The processor 1400 may control the CMS side display 1310 to display the surrounding environment image overlaid on the top view image.

In yet another embodiment, the processor 1400 may use the surrounding environment image to obtain driving environment information including at least one of a lane, locations of own vehicle and the surrounding vehicle, a relative speed between own vehicle and the surrounding vehicle, a distance between own vehicle and the surrounding vehicle, or an expected entry route of the surrounding vehicle. The processor 1400 may detect the lane and the surrounding vehicle from the surrounding environment image, and may obtain location information about the surrounding vehicle, by analyzing the surrounding environment image obtained through the external camera 1110. In yet another embodiment, the processor 1400 may detect the surrounding vehicle moving around own vehicle, by analyzing a plurality of image frames included in a surrounding environment image obtained from the external camera 1110 in real time. The processor 1400 may detect the surrounding vehicle from the surrounding environment image using, for example, image processing technology or machine learning including a deep neural network. The processor 1400 may track the location of the surrounding vehicle detected from the surrounding environment image and update location information about the surrounding vehicle in real time. In yet another embodiment, the processor 1400 may predict the expected entry route of the surrounding vehicle using the location information about the surrounding vehicle detected in each of the plurality of frames included in the surrounding environment image.

In yet another embodiment, the processor 1400 may obtain information about the location of the surrounding vehicle, the distance between own vehicle and the surrounding vehicle, and the relative speed between own vehicle and the surrounding vehicle, by tracking the location of the surrounding vehicle using not only the surrounding environment image but also the radar sensor 1210 and the ultrasonic sensor 1220. A method, performed by the processor 1400, of obtaining information such as the location, the speed, and the expected entry route of the surrounding vehicle by using the surrounding environment image and the radar sensor 1210 and the ultrasonic sensor 1220 is an example and is not limited thereto.

The processor 1400 may determine a lane change possibility with respect to a lane to be entered based on the driving environment information including at least one of the obtained locations of own vehicle and the surrounding vehicle, relative speed between own vehicle and the surrounding vehicle, distance between own vehicle and the surrounding vehicle, or expected entry route of the surrounding vehicle. The processor 1400 may display the lane change UI indicating the information about whether the lane change is possible on the top view image displayed on the CMS side display 1310. A specific embodiment of the lane change UI will be described in detail with reference to FIGS. 7A, 7B, and 7C.

In yet another embodiment, the processor 1400 may detect a lane departure that the vehicle departs from a first lane on which the vehicle is currently driving and enters a second lane which is the lane to be entered by a preset range, and in response to the detected lane departure, may control the CMS side display 1310 to display only the top view image on the CMS side display 1310. When the top view image and the surrounding environment image overlaid on the top view image are displayed on the CMS side display 1310 together, the lane departure is detected, and therefore, the processor 1400 may control the CMS side display 1310 to display only the top view image excluding the surrounding environment image. An embodiment in which the lane departure is detected, and therefore, the view of the image displayed on the CMS side display 1310 is switched will be described in detail with reference to FIG. 10.

In yet another embodiment, the processor 1400 may obtain location information about the occupant including at least one of a head location of the occupant, a head rotation direction, or a gaze direction from the occupant image obtained through the internal camera 1120, measure a distance between the occupant and the CMS side display 1310 based on the location information about the occupant, and zoom in or out a FoV of the top view image based on the measured distance. In yet another embodiment, the processor 1400 may recognize a driver's face or a passenger's face in the passenger seat from the occupant image, and may extract main feature points, such as eyes, nose, mouth, and the like, from the recognized face. In this case, the processor 1400 may use a well-known image processing technology or a machine learning-based image analysis technology using a deep neural network, but is not limited thereto. The processor 1400 may obtain three-dimensional (3D) location coordinate values of the extracted main feature points, and may obtain the occupant location information including at least one of the head location of the occupant, the head rotation direction, or the gaze direction using the obtained the 3D location coordinate values. The processor 1400 may measure a distance between the occupant's face and the CMS side display 1310 using the 3D location coordinate values of the main feature points extracted from the occupant image and a location coordinate value of the CMS side display 1310. The processor 1400 may zoom in or out the FoV of the top view image displayed on the CMS side display 1310 based on the measured distance. Another embodiment in which the processor 1400 adjusts the FoV of the top view image based on the distance between the occupant's face and the CMS side display 1310 will be described in detail with reference to FIGS. 11A and 11B.

In yet another embodiment, the processor 1400 may receive a hand gesture including at least one of a pinch in or out or a palm swipe of the occupant from a hand gesture input unit 1720 and zoom in or out the FoV of the top view image displayed on the CMS side display 1310 based on the hand gesture. Another embodiment in which the hand gesture is detected, and therefore, the FoV of the top view image displayed on the CMS side display 1310 is adjusted will be described in detail with reference to FIG. 12.

In yet another embodiment, the processor 1400 may detect a direction of a turn signal lighted by a driver input, and display the top view image on the CID 1320 based on the detected direction of the turn signal. Another embodiment in which the top view image is displayed on the CID 1320 will be described in detail with reference to FIGS. 14A and 14B.

The transceiver 1600 may perform data communication between the electronic device 1000 and the vehicle sensor module 2000 mounted on the vehicle. In an embodiment, the electronic device 1000 may communicate with the vehicle sensor module 2000 according to a controller area network (CAN).

In yet another embodiment, the transceiver 1600 may receive at least one of activation of the turn signal, information about a direction of the activated turn signal, speed sensing information, steering angle information of the vehicle, pedal sensing information, or gear lever sensing information from the vehicle sensor module 2000, by performing CAN communication. The vehicle sensor module 2000 will be described in detail with reference to FIG. 3.

The user input unit 1700 may include the touch panel 1710 and the hand gesture input unit 1720.

The touch panel 1710 may be combined with the display 1300 to provide a touch screen. For example, the touch screen may include an integrated module in which the touch panel 1710 is combined with the CID 1320 in a stack structure. For another example, the touch panel 1710 may be combined with the CMS side display 1310 in the stack structure, and the CMS side display 1310 may be implemented as the touch screen. When the CMS side display 1310 or the CID 1320 is implemented as the touch screen, the touch panel 1710 may receive a user touch input and display a graphical user interface (GUI).

The touch panel 1710 may sense the user touch input and output a touch event value corresponding to the sensed touch input. The touch panel 1710 may be implemented as various types of touch sensors, such as a capacitive type touch sensor, a pressure sensitive type touch sensor, a piezoelectric type touch sensor, and the like.

The hand gesture input unit 1720 may detect at least one of the pinch in or out or a palm swipe of the vehicle occupant.

Figure 3:
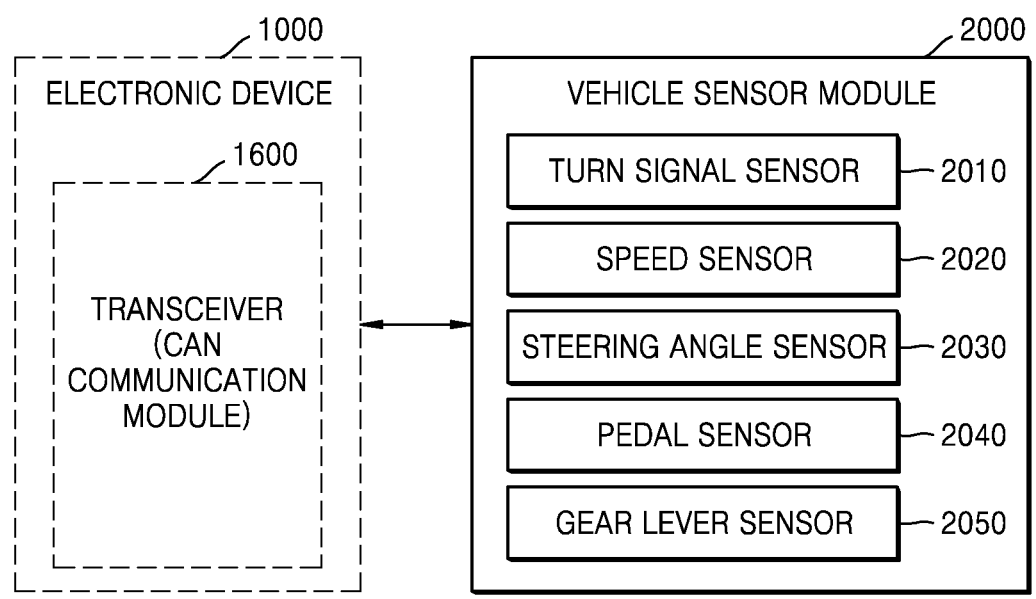
FIG. 3 is a block diagram illustrating a configuration of a vehicle sensor module according to an embodiment of the disclosure.

FIG. 3 is a block diagram illustrating a configuration of the vehicle sensor module according to an embodiment of the disclosure.

Referring to FIG. 3, a vehicle sensor module 2000 may be mounted on a vehicle, sense a manipulation of a turn signal, a speed, a steering angle, a pedal, and a gear lever of the vehicle, and the like, obtain information related to driving of the vehicle, and provide information related to driving to the electronic device 1000. The vehicle sensor module 2000 may transmit the information related to driving of the vehicle to the electronic device 1000 through the transceiver 1600 of the electronic device 1000. The vehicle sensor module 2000 may perform CAN communication with the electronic device 1000.

The vehicle sensor module 2000 is a separate component from the electronic device 1000. However, the disclosure is not limited thereto, and at least one component included in the vehicle sensor module 2000 may be included in the electronic device 1000.

The vehicle sensor module 2000 may include a turn signal sensor 2010, a speed sensor 2020, a steering angle sensor 2030, a pedal sensor 2040, and a gear lever sensor 2050.

The turn signal sensor 2010 may sense whether the turn signal is activated by a driver's manipulation. The turn signal sensor 2010 may sense a direction of the lighted the turn signal, and transmit information about the sensed lighted direction of the turn signal to the electronic device 1000. For example, the turn signal sensor 2010 may obtain information regarding which turn signal is lighted among a left direction turn signal and a right direction turn signal.

The speed sensor 2020 may sense a driving speed of the vehicle and may transmit driving speed information to the electronic device 1000.

The steering angle sensor 2030 may sense a steering angle of the vehicle by manipulation of a steering wheel and may transmit steering angle information to the electronic device 1000.

The pedal sensor 2040 may sense a pressure according to a driver's manipulation of an accelerator pedal or a brake pedal, and may transmit information about the pressure applied to the pedal to the electronic device 1000.

The gear lever sensor 2050 may sense manipulation of a transmission gear lever by the driver's manipulation, and may transmit information about the manipulation of the transmission gear lever to the electronic device 1000.

The electronic device 1000 may detect driving of the vehicle and a lane change signal, based on at least one of the information about the activation of the turn signal and the lighting direction, the speed information, the steering angle information, the pedal pressure information, or the gear lever manipulation information received from the vehicle sensor module 2000.

Figure 4:
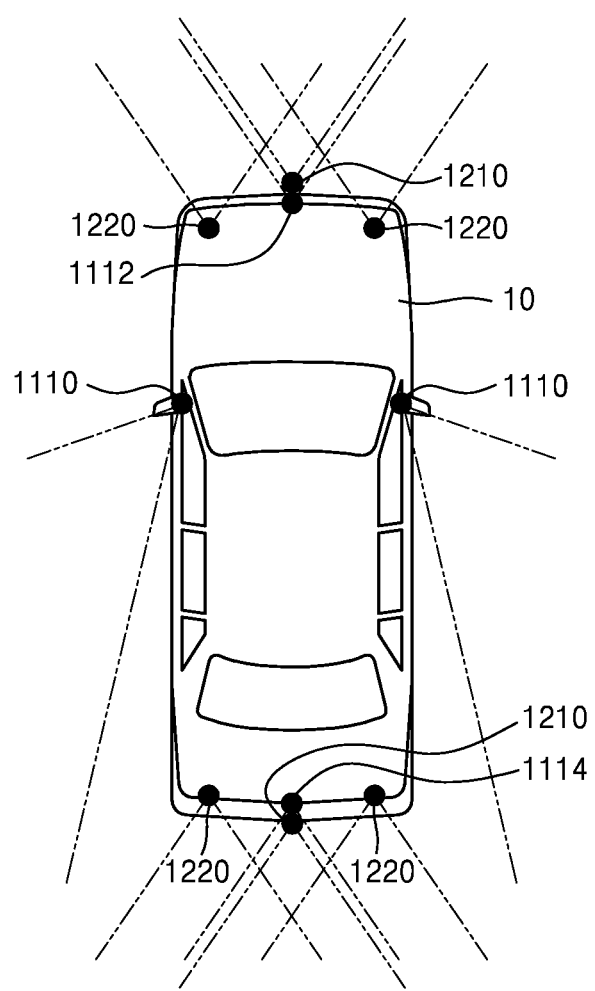
FIG. 4 is a diagram illustrating each component of a CMS installed in a vehicle according to an embodiment of the disclosure.

FIG. 4 is a diagram illustrating each component of a CMS installed in the vehicle according to an embodiment of the disclosure.

Referring to FIG. 4, the external camera 1110, a front camera 1112, a rear camera 1114, the radar sensor 1210, and the ultrasonic sensor 1220 may be arranged in the vehicle 10.

The external camera 1110 may be disposed on left and right sides of the vehicle 10. The external camera 1110 may obtain a surrounding environment image of a moving object including at least one of a surrounding vehicle, a two-wheeled vehicle, or a pedestrian, by capturing surrounding environment of the left and right sides and the rear of the vehicle 10.

The front camera 1112 may be disposed on a front part of the vehicle 10. In an embodiment, the front camera 1112 may include a lane camera that captures the front of the vehicle 10 to obtain image information of a lane.

The rear camera 1114 may be mounted on a rear part of the vehicle 10, for example, a trunk, a rear bumper, a rear pillar, or a rear windshield. The rear camera 1114 may capture the rear of the vehicle 10 to obtain a rear environment image.

In another embodiment, the external camera 1110, the front camera 1112, and the rear camera 1114 may constitute a SVM system. The SVM system is a system that provides an image showing a situation of a surrounding 360° space of the vehicle 10 as looking down from above the vehicle 10 in real time. The SVM system may correct a distortion of the surrounding environment image captured and input from each of the external camera 1110, the front camera 1112, and the rear camera 1114, and may generate a top view image as looking down from above in the form of a bird's eye view of the surrounding of the vehicle 10 using a time change and an image synthesis technology.

The radar sensor 1210 may be disposed on the front part of the vehicle 10. For example, the radar sensor 1210 may be mounted on a front grill, a front bumper, or a front lamp of the vehicle 10, but is not limited thereto. The radar sensor 1210 may generate an electromagnetic wave in a radio wave or microwave spectrum to detect a moving object located around the vehicle 10, for example, a surrounding vehicle, a two-wheeled vehicle, a pedestrian, and the like, and may include a transmission antenna that radiates the electromagnetic wave and a reception antenna that receives the electromagnetic wave. The transmission antenna may radiate the radio wave (pulsed or continuous), may receive the radio wave reflected from the moving object by using the reception antenna, and may provide information about at least one of the location, speed, or angle of the moving object to the processor 1400 (see FIG. 2).

The ultrasonic sensor 1220 may be disposed on the front part of the vehicle 10. The ultrasonic sensor 1220 may be mounted on, for example, a front bumper of the vehicle 10 or a front lamp, but is not limited thereto. The ultrasonic sensor 1220 may transmit an ultrasonic signal to a moving object, including a surrounding vehicle, a two-wheeled vehicle, or a pedestrian, located in the front and rear of the vehicle 10, and may receive an ultrasonic echo signal reflected from the moving object. The ultrasonic sensor 1220 may provide the received ultrasonic echo signal to the processor 1400.

FIGS. 5A, 5B, 5C, and 5D are diagrams illustrating an embodiment of CMS side displays according to various embodiments of the disclosure.

Figure 5A:
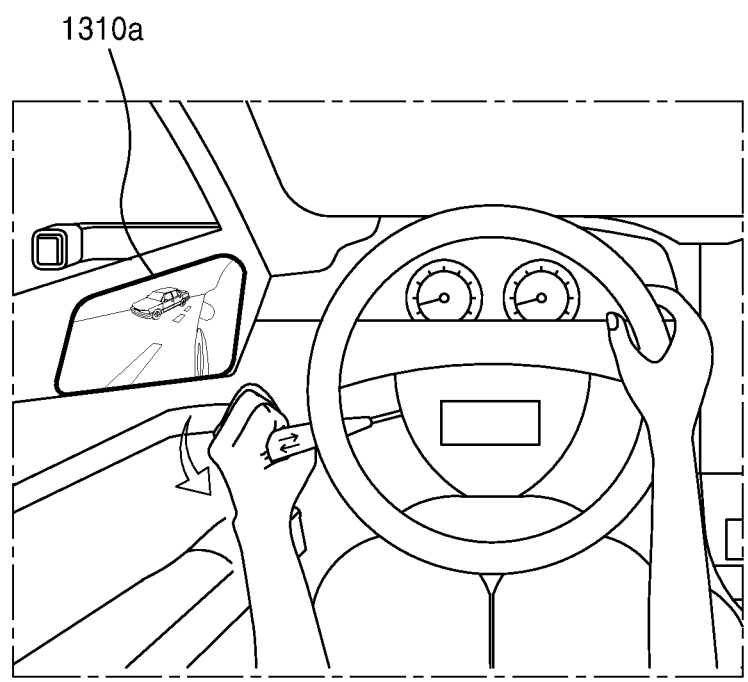
FIGS. 5A, 5B, 5C, and 5D are diagrams illustrating an embodiment of CMS side displays according to various embodiments of the disclosure.

Referring to FIG. 5A, the CMS side displays 1310a may be disposed on the left and right sides of a steering wheel inside a vehicle, respectively. The left CMS side display 1310a may be disposed adjacent to a driver seat. Referring to FIG. 1 together, the right CMS side display 1310R may be disposed adjacent to a passenger seat. In an embodiment, the CMS side display 1310a may be mounted on or included in a dashboard, but is not limited thereto. In an embodiment, the CMS side displays 1310a may be mounted on a door trim of the driver seat and a door trim of the passenger seat, respectively.

Figure 5B:
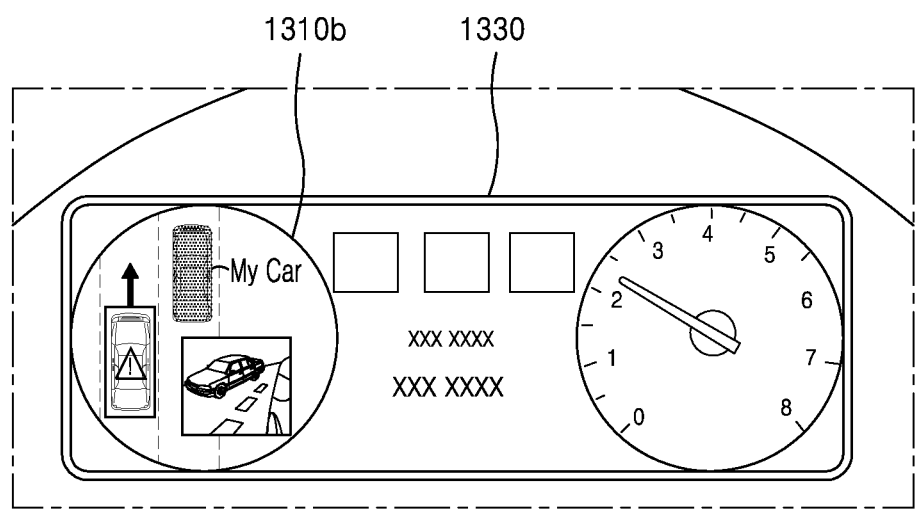

Referring to FIG. 5B, the CMS side display 1310a may be included in a cluster display 1330.

The cluster display 1330 may display vehicle information including at least one of a driving state of the vehicle or operating state information of various devices. The cluster display 1330 may be included in the dashboard. The cluster display 1330 may display, for example, at least one of revolutions per minute (RPM) information of an engine, speed information, turn signal activation state information, fuel information, or coolant temperature information. The cluster display 1330 may include a fuel gauge, a water temperature gauge, an engine thermometer, various warning lamps, etc. indicating the state of the vehicle, in addition to a speedometer that displays a driving speed and a mileage of the vehicle and a clock together, a tachometer that displays the RPM information of the engine, and a tripmeter that displays the mileage.

The cluster display 1330 may be configured as a physical device including at least one of, for example, a liquid crystal display (LCD) display, a plasma display panel (PDP) display, an organic light emitting diode (OLED) display, a field emission display (FED), a light emitting diode (LED) display, a vacuum fluorescent display (VFD), a digital light processing (DLP) display, a flat panel display, a 3D display, or a transparent display, but is not limited thereto.

The CMS side display 1310b may be included in a partial region within the cluster display 1330. In an embodiment, the CMS side display 1310b may replace a speedometer that displays the driving speed information of the cluster display 1330 to display at least one of a surrounding environment image or a top view image. In another embodiment, the CMS side display 1310b may replace the tachometer that displays the RPM information of the engine of the cluster display 1330 to display at least one of the surrounding environment image or the top view image.

In an embodiment, when the processor 1400 (see FIG. 2) receives information indicating that a left turn signal is activated from the turn signal sensor (2010, see FIG. 3) of the vehicle sensor module 2000 (see FIG. 3), a region of the cluster display 1330 that displays the speedometer may be replaced with the CMS side display 1310b. Similarly, when the processor 1400 receives information indicating that a right turn signal is activated from the turn signal sensor 2010, a region of the cluster display 1330 that displays the tachometer may be replaced with the CMS side display 1310b.

Figure 5C:
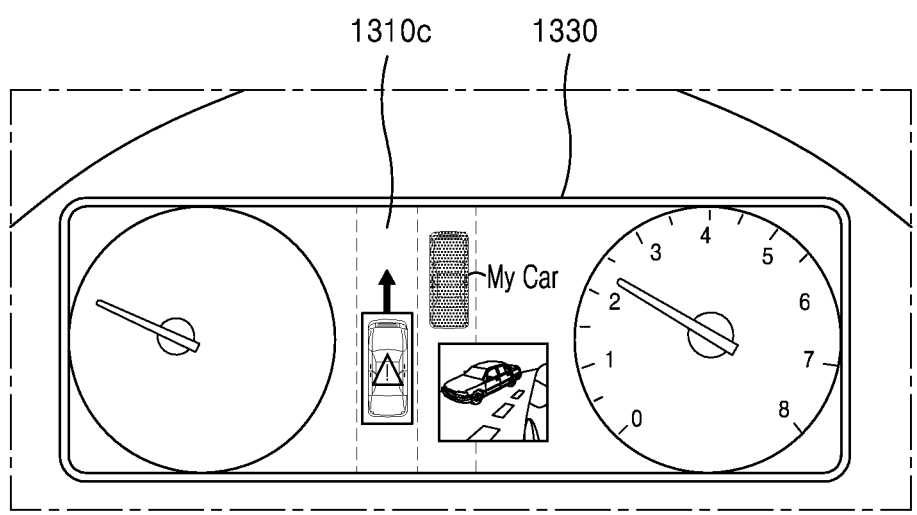

Referring to FIG. 5C, the CMS side display 1310c may be included on a partial region of the cluster display 1330. In an embodiment, the CMS side display 1310c may display at least one of the surrounding environment image or the top view image between the regions of the of the cluster display 1330 that display the driving speedometer and the tachometer. The description of the cluster display 1330 is the same as that of the cluster display 1330 illustrated in FIG. 5B, and thus a redundant description thereof is omitted.

Figure 5D:
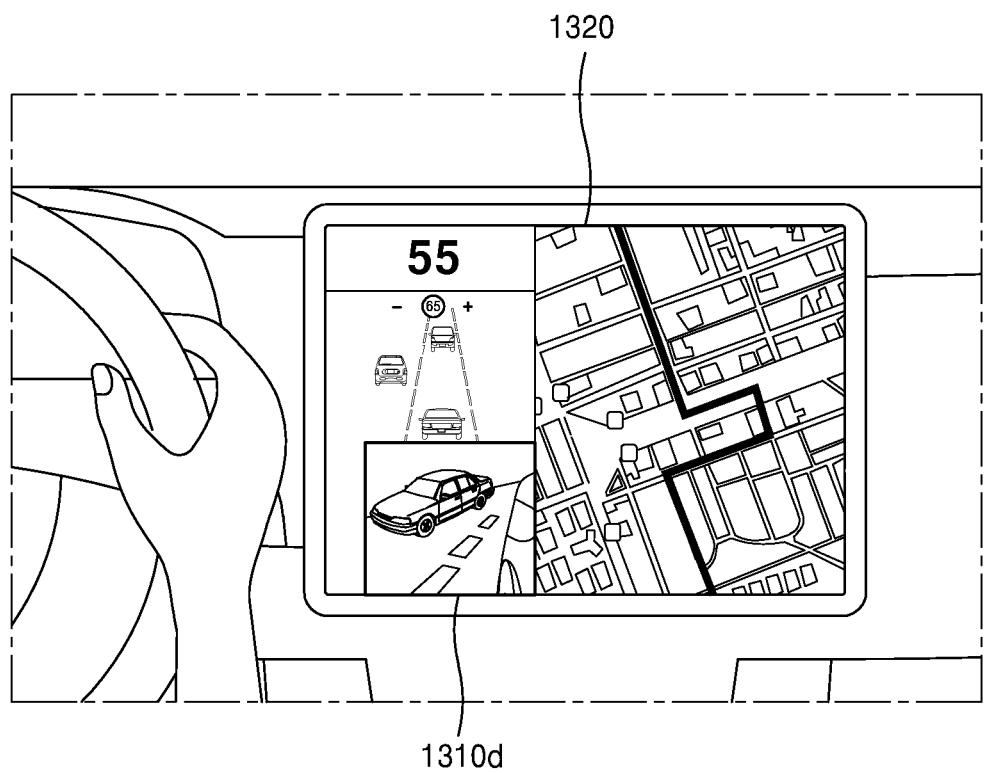

Referring to FIG. 5D, the CMS side display 1310d may be included in a partial region within the CID 1320. The CID 1320 may be disposed between the driver seat and the passenger seat on the dashboard of the vehicle. The CID 1320 may display a direction navigation to a destination or display a top view image of a surrounding vehicle.

In an embodiment, the CMS side display 1310d may display at least one of the surrounding environment image or the top view image on a divided partial region within the CID 1320.

Figure 6A:
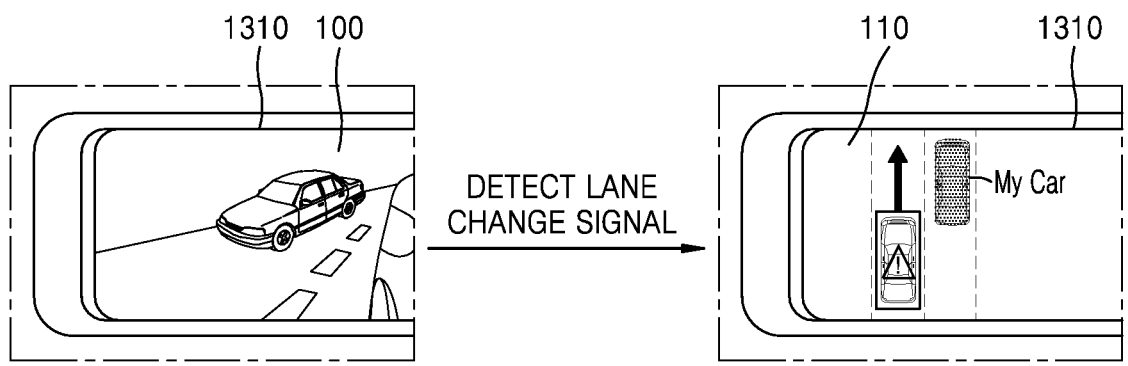
FIGS. 6A and 6B are diagrams illustrating an embodiment in which an electronic device of the disclosure switches a view of an image displayed on a CMS side display when detecting a lane change signal of a vehicle according to various embodiments of the disclosure.
Figure 6B:
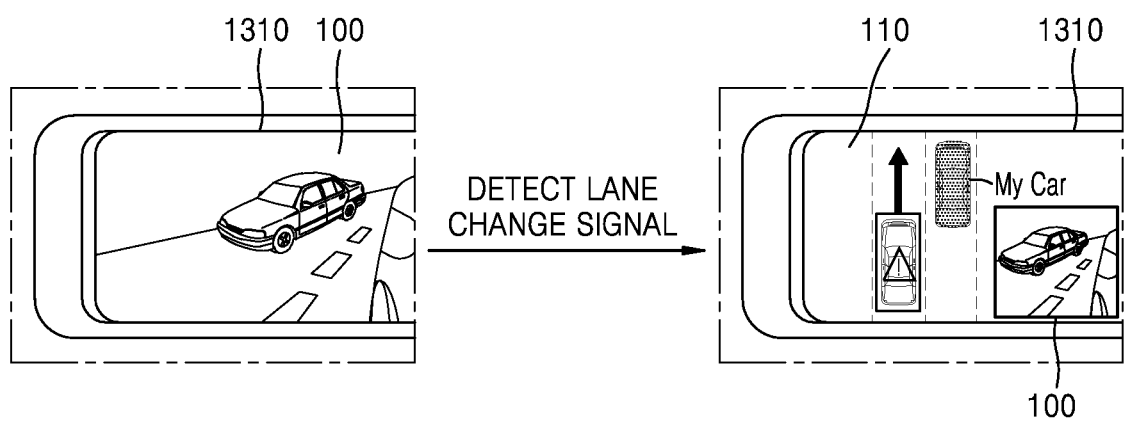

FIGS. 6A and 6B are diagrams illustrating an embodiment in which an electronic device of the disclosure switches a view of an image displayed on the CMS side display when detecting a lane change signal of a vehicle according to various embodiments of the disclosure.

Referring to FIG. 6A, the CMS side display 1310 may display the surrounding environment image 100 obtained by in real time capturing a surrounding environment of the left and right sides and the rear of the vehicle captured through the external camera 1110 (see FIGS. 1 and 2).

While the CMS side display 1310 displays the surrounding environment image 100, the processor 1400 (see FIG. 2) of the electronic device 1000 may detect the lane change signal of the vehicle. When a driver manipulates the turn signal lever 2100 (see FIG. 1) of the vehicle and activates (lights) a turn signal, the processor 1400 may detect the lane change signal of the vehicle, by obtaining activation information of the turn signal. In another embodiment, the processor 1400 may detect the lane change signal including a turn or a lane change based on route information of a navigation system installed in the vehicle.

When detecting the lane change signal of the vehicle, the electronic device 1000 may switch the surrounding environment image 100 displayed on the CMS side display 1310 to the top view image 110, and display the top view image 110 on the CMS side display 1310. The top view image 110 is an image obtained using a SVM system installed in the vehicle, and displays locations of own vehicle and the surrounding vehicle detected from the surrounding environment image 100 in a virtual image. The top view image 110 may mean an image showing a situation of the surrounding 360° space of own vehicle as looking down from the vehicle.

Referring to FIG. 6B, when detecting the lane change signal, the electronic device 1000 may switch the surrounding environment image 100 displayed on the CMS side display 1310 to the top view image 110, reduce a frame size of the surrounding environment image 100, and display the reduced surrounding environment image 100 by overlaying the reduced surrounding environment image 100 on the switched top view image 110. The processor 1400 (see FIG. 2) of the electronic device 1000 may control the CMS side display 1310 to display the surrounding environment image 100 overlaid on the top view image 110.

The embodiment shown in FIG. 6B is the same as the embodiment shown in FIG. 6A except for a feature of overlaying and displaying the surrounding environment image 100 on the top view image 110, and thus a redundant description thereof is omitted.

Figure 7A:
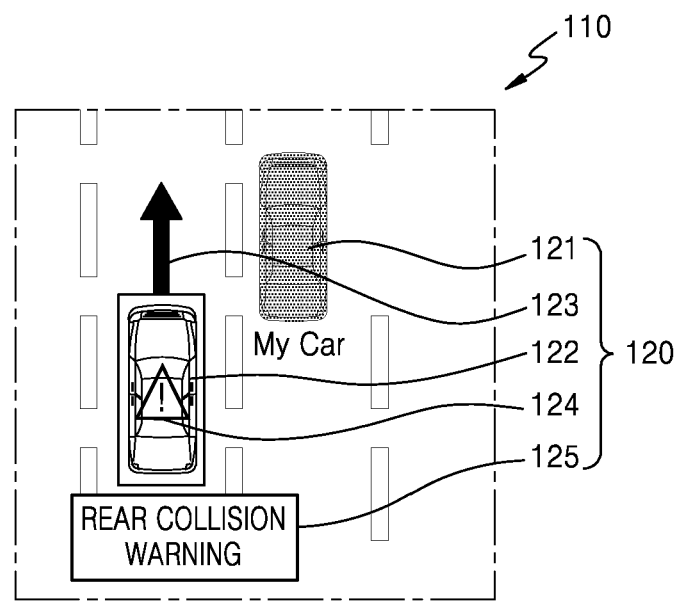
FIGS. 7A, 7B, and 7C are diagrams illustrating an embodiment of an image and lane change user interfaces (UIs) displayed on a CMS side display according to various embodiments of the disclosure.
Figure 7B:
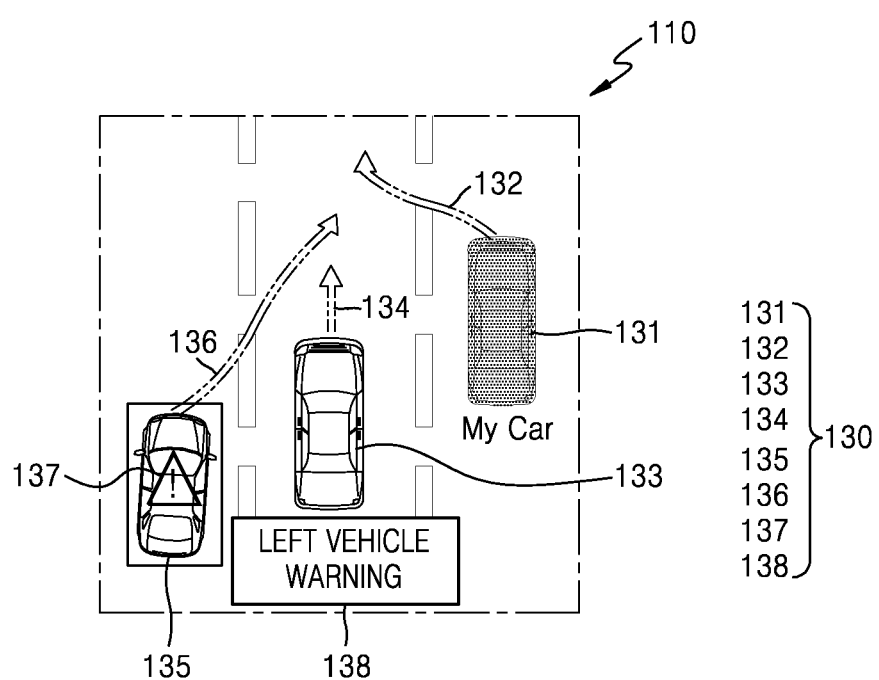
Figure 7C:
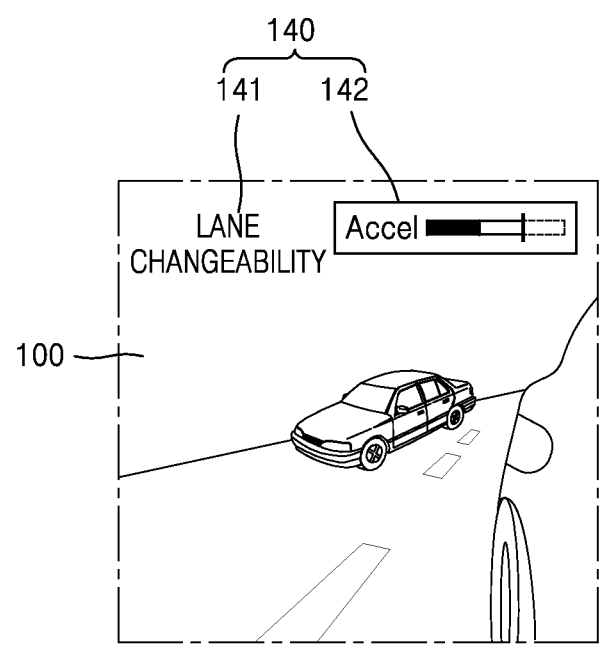

FIGS. 7A, 7B, and 7C are diagrams illustrating an embodiment of the top view image and lane change UIs displayed on a CMS side display according to various embodiments of the disclosure.

Referring to FIG. 7A, the lane change UI 120 may be displayed on the top view image 110. The lane change UI 120 may include an own vehicle image 121, a first surrounding vehicle image 122, an expected entry route UI 123 of a surrounding vehicle, a warning icon 124, and a warning phrase 125.

The processor 1400 of the electronic device 1000 may obtain driving environment information including at least one of a lane, locations of own vehicle and the surrounding vehicle, a relative speed between own vehicle and the surrounding vehicle, a distance between own vehicle and the surrounding vehicle, or an expected entry route of the surrounding vehicle, by analyzing the surrounding environment image captured by using the external camera 1110 (see FIGS. 1 and 2). In an embodiment, the processor 1400 may obtain information about the location of the surrounding vehicle, the distance between own vehicle and the surrounding vehicle, and the relative speed between own vehicle and the surrounding vehicle, by tracking the location of the surrounding vehicle using not only the surrounding environment image but also the radar sensor 1210 (see FIGS. 2 and 4) and the ultrasonic sensor 1220 (see FIGS. 2 and 4).

The processor 1400 may generate the own vehicle image 121 and the first surrounding vehicle image 122 based on the obtained locations of own vehicle and the surrounding vehicle, generate the expected entry route UI 123 indicating an expected entry route of the surrounding vehicle, and display the generated images 121 and 122 and entry route UI 123 on the top view image 110. The processor 1400 may display a warning UI informing that a situation such as a collision may occur when changing lanes on the top view image 110, based on the distance between own vehicle and the surrounding vehicle, the relative speed, and the expected entry route of the surrounding vehicle. The warning UI may include the warning icon 124 and the warning phrase 125.

Referring to FIG. 7B, the lane change UI 130 may be displayed on the top view image 110. The lane change UI 130 may include an own vehicle image 131, an entry route UI 132 of own vehicle, a first surrounding vehicle image 133, an expected entry route UI 134 of a first surrounding vehicle, a second surrounding vehicle image 135, an expected entry route UI 136 of a second surrounding vehicle, a warning mark 137, and a warning phrase 138.

The embodiment shown in FIG. 7B is the same as the embodiment shown in FIG. 7A except that the lane change UI 130 displayed on the top view image 110 has a plurality of surrounding vehicles (the first surrounding vehicle and the second surrounding vehicle), and displays an expected entry route of each of the plurality of surrounding vehicles as an UI, and thus, a redundant description thereof is omitted. In the embodiment shown in FIG. 7B, the warning mark 137 and the warning phrase 138 that warn of the second surrounding vehicle spaced apart from the current vehicle by two lanes may be displayed on the top view image 110. The warning phrase 138 may be, for example, 'left vehicle warning'.

Referring to FIG. 7C, the lane change UI 140 may be displayed on the surrounding environment image 100. The lane change UI 140 may include a lane changeability notification UI 141 and an acceleration UI 142.

The lane changeability notification UI 141 may display information about whether own vehicle may depart from a lane on which own vehicle is currently driving and change to a lane on which the surrounding vehicle is driving, based on the relative speed of own vehicle and the surrounding vehicle and the location between own vehicle and the surrounding vehicle. In an embodiment, the processor 1400 of the electronic device 1000 may analyze the surrounding environment image 100, may determine a lane change possibility with respect to a lane to be entered based on at least one piece of information of the locations of own vehicle and the surrounding vehicle, the relative speed between own vehicle and the surrounding vehicle, the distance between own vehicle and the surrounding vehicle, or the expected entry route of the surrounding vehicle obtained by using the radar sensor 1210 (see FIGS. 2 and 4) and the ultrasonic sensor 1220 (see FIGS. 2 and 4), and may generate the lane changeability notification UI 141 based on a determination result. The processor 1400 may display the lane changeability notification UI 141 on the CMS side display.

The acceleration UI 142 is a UI indicating a speed that needs to be accelerated in order to change the current lane to a lane that own vehicle intends to enter. The processor 1400 may measure the speed at which own vehicle needs to accelerate in order to change the lane to be entered based on the distance between own vehicle and the surrounding vehicle and the relative speed between own vehicle and the surrounding vehicle, and generate the acceleration UI 142 based on a measurement result. The processor 1400 may display the acceleration UI 142 on the CMS side display.

In the embodiment illustrated in FIG. 7C, the lane changeability notification UI 141 and the acceleration UI 142 are illustrated as being displayed on the surrounding environment image 100, but are not limited thereto. In an embodiment, the lane changeability notification UI 141 and the acceleration UI 142 may be displayed on the top view image 110 (see FIGS. 7A and 7B).

In the embodiments shown in FIGS. 6A to 7C, the CMS side display 1310 of the disclosure may display the top view image 110, and display the lane change UIs 120, 130, and 140 indicating at least one of own vehicle, the lane, the location of the surrounding vehicle, the relative speed between own vehicle and the surrounding vehicle, the distance between own vehicle and the surrounding vehicle, or the expected entry route of the surrounding vehicle, thereby intuitively providing related information to a driver in the lane change or turn situation. Accordingly, the CMS side display 1310 according to an embodiment of the disclosure may improve driving reliability and provide a sense of stability to the driver.

Figure 8:
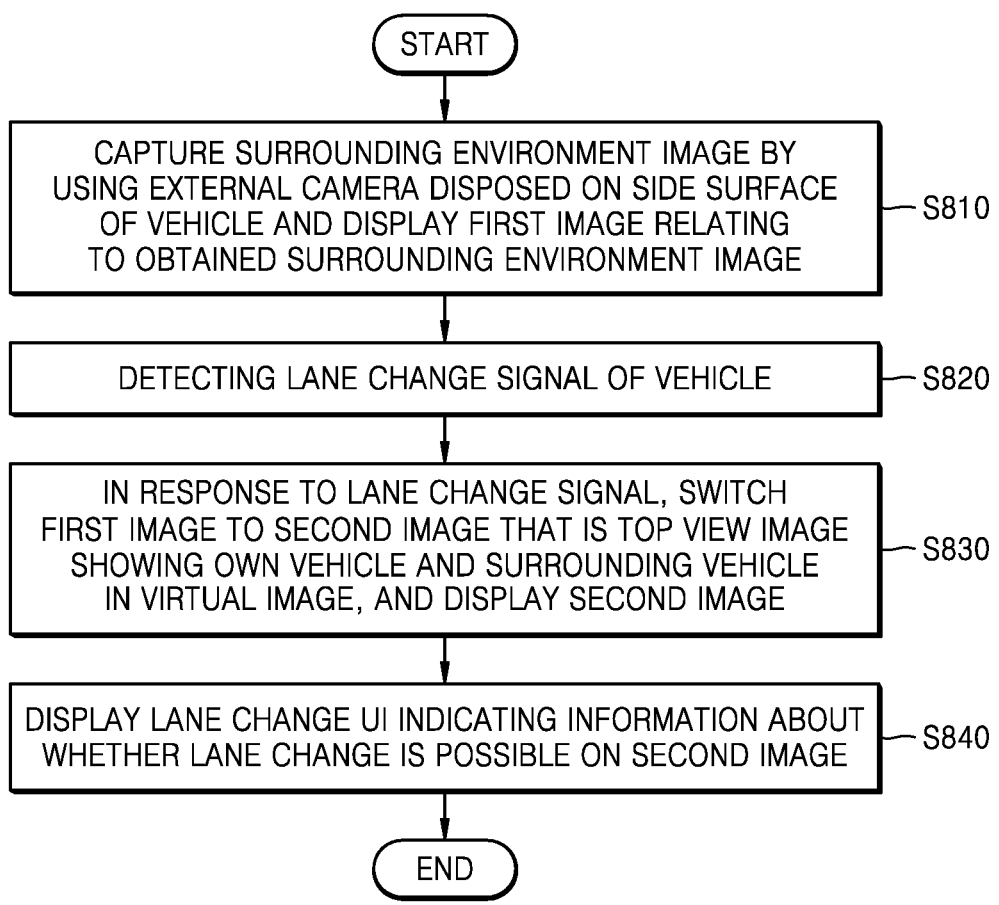
FIG. 8 is a flowchart illustrating an operating method of an electronic device according to an embodiment of the disclosure.

FIG. 8 is a flowchart illustrating a method of operating an electronic device according to an embodiment of the disclosure.

Referring to FIG. 8, in operation S810, the electronic device 1000 may obtain a surrounding environment image by using an external camera disposed on the side of a vehicle, and display a first image related to the obtained surrounding environment image. In an embodiment, the external camera may be configured as a CMS view camera that captures a moving object including at least one of a surrounding vehicle, a two-wheeled vehicle, or a pedestrian located in the surrounding environments of the left, right, and rear of the vehicle. The external camera may obtain the surrounding environment image by capturing the surrounding environment image in real time, and may provide the obtained surrounding environment image to the processor 1400 (see FIG. 2). In an embodiment, the processor 1400 may display the surrounding environment image on the CMS side display 1310 (see FIG. 2).

In operation S820, the electronic device 1000 detects a lane change signal of the vehicle.

In another embodiment, the electronic device 1000 may detect a user input for lighting a turn signal by manipulating a turn signal lever of the vehicle. In yet another embodiment, the processor 1400 may obtain activation (lighting) information of the turn signal according to a user input for manipulating the turn signal lever 2100 (see FIG. 3) from the vehicle sensor module 2000 (see FIG. 3), and may detect the user input for lighting the turn signal based on the activation information of the turn signal. In yet another embodiment, the processor 1400 may obtain information about a direction of the activated turn signal (e.g., activation of the left turn signal or activation of the right indicator) from the vehicle sensor module 2000.

In yet another embodiment, the electronic device 1000 may detect a turn or a lane change based on driving route information of a navigation system of the vehicle. In yet another embodiment, when the vehicle is driven in an autonomous driving mode, the processor 1400 may obtain driving information such as a steering angle, a speed, and the like, from the vehicle sensor module 2000, and may detect a turn signal or a lane change signal based on the obtained driving information. For example, the processor 1400 may detect a situation in which the vehicle turns at a crossroad using route information of the navigation system.

In yet another embodiment, the processor 1400 may obtain information about a steering angle change of the vehicle from the vehicle sensor module 2000 and may detect the turn signal or the lane change signal based on the obtained information about the steering angle change.

In operation S830, in response to the lane change signal, the electronic device 1000 may switch a first image to a second image that is a top view image that displays a surrounding vehicle and own vehicle in a virtual image and display the second image.

In yet another embodiment, when the lane change signal is detected, the electronic device 1000 may switch the first image that is the surrounding environment image to the second image that is the top view image, and may display the switched second image on the CMS side display 1310 (see FIGS. 1 and 2). The second image is a top view image showing own vehicle and the surrounding vehicle in the virtual image as looking down from above in the form of a bird's eye view. The processor 1400 may capture a situation of a surrounding 360° space of the vehicle by using a SVM system installed in the vehicle, correct a distortion of a captured image, and may generate the top view image using a time change and an image synthesis technology.

According to yet another embodiment, the electronic device 1000 may switch a view of an image displayed on any one of the CMS side display 1310L (see FIG. 1) disposed on the left and the CMS side display 1310R (see FIG. 1) disposed on the right based on the direction of the activated turn signal. For example, when a user input for lighting a left turn signal is received through an input of pressing the turn signal lever 2100 (see FIG. 1) in a downward direction, the processor 1400 may switch the surrounding environment image displayed on the left CMS side display 1310L to the top view image, and may display the top view image. For another example, when a user input for lighting a right turn signal is received by manipulating the turn signal lever 2100 in an upward direction, the processor 1400 may switch the surrounding environment image displayed on the right CMS side display 1310R to the top view image, and may display the top view image.

In an embodiment, the processor 1400 may switch the surrounding environment image displayed on the CMS side display 1310 to the top view image in response to the lane change signal, may reduce a frame size of the surrounding environment image, and may overlay the surrounding environment image on the top view image. The processor 1400 may control the CMS side display 1310 to display the surrounding environment image overlaid on the top view image.

In operation S840, the electronic device 1000 may display a lane change UI indicating information about whether the lane change is possible on the second image. In yet another embodiment, the electronic device 1000 may obtain driving environment information including at least one of a lane, locations of own vehicle and the surrounding vehicle, a relative speed between own vehicle and the surrounding vehicle, a distance between own vehicle and the surrounding vehicle, or an expected entry route of the surrounding vehicle, by analyzing the surrounding environment image. In an embodiment, the processor 1400 may obtain information about the location of the surrounding vehicle, the distance between own vehicle and the surrounding vehicle, and the relative speed between own vehicle and the surrounding vehicle, by tracking the location of the surrounding vehicle using not only the surrounding environment image but also the radar sensor 1210 (see FIGS. 2 and 4) and the ultrasonic sensor 1220 (see FIGS. 2 and 4). The processor 1400 may display the lane change UI indicating the information about whether the lane change is possible on the CMS side display 1310 (see FIGS. 1 and 2) based on the obtained driving environment information.

In yet another embodiment, the lane change UI may be displayed on the top view image displayed on the CMS side display 1310. However, the disclosure is not limited thereto, and the lane change UI may be displayed on the surrounding environment image. For the lane change UI, reference is made to the descriptions of the lane change UIs 120, 130, and 140 respectively illustrated in FIGS. 7A to 7C.

Figure 9:
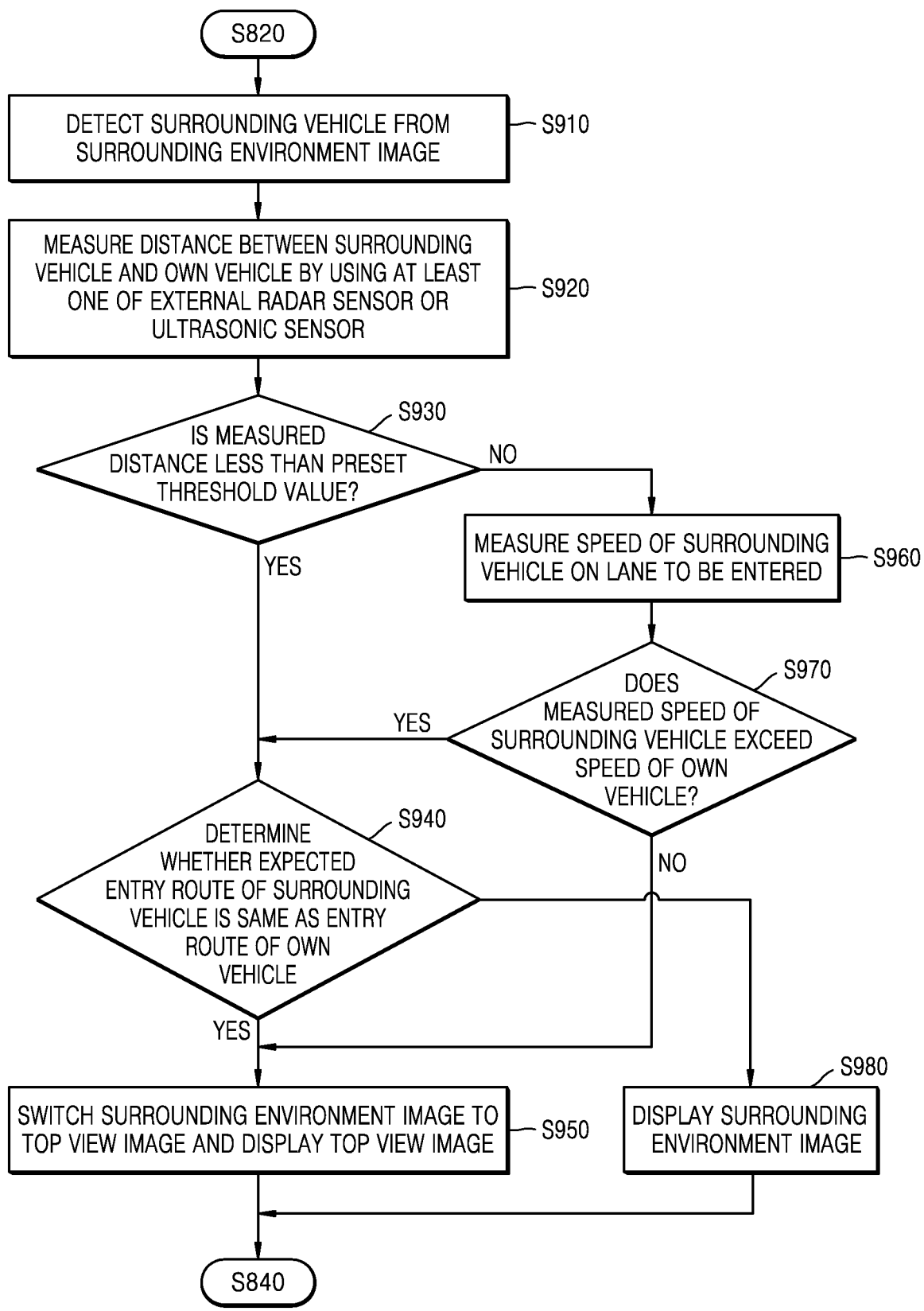
FIG. 9 is a flowchart illustrating an operating method of an electronic device according to an embodiment of the disclosure.

FIG. 9 is a flowchart illustrating a method of operating an electronic device according to an embodiment of the disclosure.

The embodiment shown in FIG. 9 relates to operations additionally performed between operations S820 and S840 shown in FIG. 8. Operation S910 is performed is performed after operation S820 of FIG. 8 is performed.

Referring to FIG. 9, in operation S910, the electronic device 1000 may detect a surrounding vehicle from a surrounding environment image. The electronic device 1000 may detect a lane and the surrounding vehicle from the surrounding environment image, and obtain location information about the surrounding vehicle, by analyzing the surrounding environment image obtained through using the external camera 1110 (see FIGS. 1 and 2).

In an embodiment, the processor 1400 (refer to FIG. 2) of the electronic device 1000 may detect the surrounding vehicle moving in the surrounding of own vehicle by analyzing a plurality of image frames included in the surrounding environment image. The processor 1400 may detect the surrounding vehicle from the surrounding environment image using, for example, image processing or machine learning including a deep neural network.

In operation S920, the electronic device 1000 may measure a distance between the surrounding vehicle and own vehicle by using at least one of an external radar sensor or an ultrasonic sensor. In another embodiment, the processor 1400 may obtain information about a location of the surrounding vehicle and the distance between own vehicle and the surrounding vehicle, by transmitting an electromagnetic wave to the surrounding vehicle by using the radar sensor 1210 (see FIGS. 2 and 4) mounted outside a vehicle, and receiving the electromagnetic wave reflected from the surrounding vehicle. In yet another embodiment, the processor 1400 may obtain information about the location of the surrounding vehicle and the distance between own vehicle and the surrounding vehicle, by transmitting an ultrasonic signal to the surrounding vehicle using the ultrasonic sensor 1220 (see FIGS. 2 and 4) mounted outside the vehicle, receiving an ultrasonic echo signal reflected from the surrounding vehicle, and analyzing the received ultrasonic echo signal.

In operation S930, the electronic device 1000 may determine whether the measured distance is equal to or less than a preset threshold value.

When the measured distance between own vehicle and the surrounding vehicle is equal to or less than the threshold value (operation S940), the electronic device 1000 may determine whether an expected entry route of the surrounding vehicle is the same as an entry route of own vehicle. In yet another embodiment, the processor 1400 may track the location of the surrounding vehicle detected from the surrounding environment image, and may update location information about the surrounding vehicle in real time. In yet another embodiment, the processor 1400 may predict the expected entry route of the surrounding vehicle using the location information about the surrounding vehicle detected from each of the plurality of frames included in the surrounding environment image. The processor 1400 may determine whether the expected entry route of the surrounding vehicle is the same as the entry route of own vehicle.

When it is determined that the expected entry route of the surrounding vehicle is the same as the entry route of own vehicle (operation S950), the electronic device 1000 may switch the surrounding environment image to a top view image and may display the top view image. The processor 1400 may switch the surrounding environment image displayed on the CMS side display 1310 (see FIGS. 1 and 2) to the top view image, and may display the top view image on the CMS side display 1310.

When it is determined that the expected entry route of the surrounding vehicle is not the same as the entry route of own vehicle (operation S980), the electronic device 1000 may display the surrounding environment image on the CMS side display 1310. In operation S980, a view of the surrounding environment image displayed on the CMS side display 1310 from operation S810 of FIG. 8 may be continuously maintained.

When the measured distance between own vehicle and the surrounding vehicle exceeds the threshold value (operation S960), the electronic device 1000 may measure a speed of the surrounding vehicle on a lane to be entered. In yet another embodiment, the processor 1400 may measure the speed of the surrounding vehicle, by detecting the surrounding vehicle detected from the plurality of frames of the surrounding environment image and calculating a degree of movement of the surrounding vehicle in each of the plurality of frames. In yet another embodiment, the processor 1400 may measure the speed of the surrounding vehicle, by calculating a distance change between the surrounding vehicle and own vehicle in real time by using at least one of the external radar sensor 1210 or the ultrasonic sensor 1220.

In operation S970, the electronic device 1000 may determine whether the measured speed of the surrounding vehicle exceeds the speed of own vehicle.

When it is determined that the measured speed of the surrounding vehicle exceeds the speed of own vehicle, the electronic device 1000 may determine whether the expected entry route of the surrounding vehicle is the same as the entry route of own vehicle (operation S940).

When it is determined that the measured speed of the surrounding vehicle is less than or equal to the speed of own vehicle, the electronic device 1000 may switch the surrounding environment image displayed on the CMS side display 1310 to the top view image and displays the top view image (operation S950).

Figure 10:
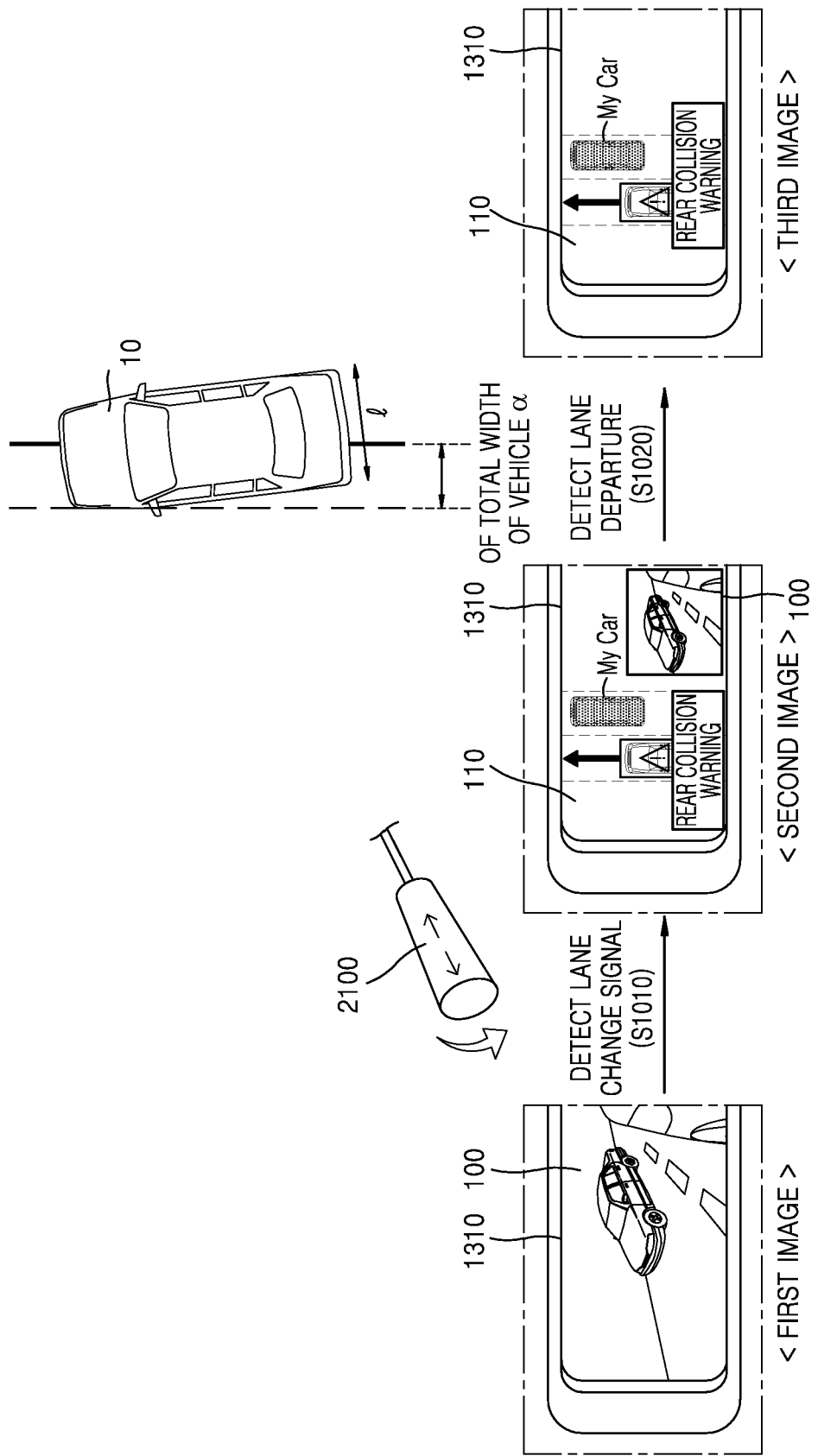
FIG. 10 is a diagram illustrating an embodiment in which an electronic device of the disclosure detects a situation including a lane change signal and a lane departure of a vehicle and switches a view of an image displayed on a CMS side display based on the detected situation according to an embodiment of the disclosure.

FIG. 10 is a diagram illustrating an embodiment in which an electronic device of the disclosure detects a situation including a lane change signal and a lane departure of a 10 and switches a view of an image displayed on a CMS side display based on the detected situation according to an embodiment of the disclosure.

Referring to FIG. 10, the electronic device 1000 may change the view of the image displayed on the CMS side display 1310 two times.

The CMS side display 1310 may display a first image that is the surrounding environment image 100 obtained by capturing the surrounding of the vehicle 10 by using the external camera 1110 (see FIGS. 1 and 2).

When detecting a lane change signal in operation S1010, the electronic device 1000 may switch the first image displayed on the CMS side display 1310 to a second image and may display the second image. In an embodiment, the electronic device 1000 may detect the lane change signal of the vehicle 10, by detecting a user input for manipulating the turn signal lever 2100. In another embodiment, the electronic device 1000 may detect the lane change signal including a turn or a lane change based on route information of a navigation system installed in the vehicle 10.

The second image may include the top view image 110 and the surrounding environment image 100. In the second image, the surrounding environment image 100 may be overlaid on the top view image 110. In an embodiment, the electronic device 1000 may reduce a frame size of the surrounding environment image 100 displayed on the CMS side display 1310, may overlay and may display the reduced surrounding environment image 100 on the top view image 110.

In operation S1020, the electronic device 1000 may detect a lane departure of the vehicle 10. In an embodiment, the electronic device 1000 may detect a lane from an image by analyzing the image captured by using the front camera 1112 disposed on the front part of the vehicle 10, the rear camera 1114 disposed on the rear part of the vehicle 10, and the external camera 1110 disposed on the left and right parts of the vehicle 10. The electronic device 1000 may detect whether the vehicle 10 departs from a first lane on which the vehicle 10 is currently driving and enters a second lane which is a lane to be entered by a preset range. For example, the electronic device 1000 may detect that the vehicle 10 has departed from the lane when the vehicle 10 enters the second lane which is the lane to be entered, by α % or more of a total width 1 of the vehicle. For example, α % may be 40%, but is not limited thereto.

When the lane departure is detected in operation S1020, the electronic device 1000 may switch the second image displayed on the CMS side display 1310 to a third image and display the third image. The third image is an image including only the top view image 110 excluding the surrounding environment image 100 overlaid on the second image.

In the embodiment shown in FIG. 10, when the lane change signal is detected, the electronic device 1000 of the disclosure may display the second image displaying the top view image 110 and the surrounding environment image 100 together on the CMS side display 1310, but when the vehicle 10 departs from the first lane on which the vehicle 10 is actually driving, the electronic device 1000 of the disclosure may switch the second image to the third image including only the top view image 110 and display the third image. Even when a driver manipulates the turn signal lever 2100 to light a left or right turn signal, because the vehicle actually continues to drive in the first lane on which the vehicle is actually driving, a probability of an accident such as a collision with the surrounding vehicle may be relatively low. In this case, the electronic device 1000 may provide both the top view image 110 and the surrounding environment image 100. However, when the vehicle 10 departs from the first lane while driving, because the driver has a high probability of looking ahead and the risk of an accident is relatively increased, the electronic device 1000 may display only the top view image 110 that specifically displays a location relationship with the surrounding vehicle on the CMS side display 1310. The electronic device 1000 of the disclosure may detect each situation of the lane change signal or the lane departure, and switch the view of the image displayed on the CMS side display 1310 according to the detected situation, thereby improving reliability and enhancing stability.

FIGS. 11A and 11B are diagrams illustrating an embodiment in which an electronic device of the disclosure changes a FoV of an image displayed on a CMS side display based on a distance change between the CMS side display and a driver according to various embodiments of the disclosure.

Referring to FIG. 11A, the electronic device 1000 may obtain an occupant image by capturing at least one of a driver or a passenger in a passenger seat by using the internal camera 1120. The internal camera 1120 may be disposed, for example, on an upper end of a dashboard, a room mirror, or a cluster inside a vehicle. However, a location at which the internal camera 1120 is disposed is not limited to the above-described example.

The internal camera 1120 may capture an occupant's face to obtain the occupant image, and provide the obtained occupant image to the processor 1400 (see FIG. 2). The processor 1400 may obtain location information about the occupant including at least one of a head location of the occupant, a head rotation direction, or a gaze direction from the occupant image obtained from the internal camera 1120. In an embodiment, the processor 1400 may detect a driver's face or a passenger's face in the passenger seat from the occupant image, and extract main feature points, such as eyes, nose, mouth, etc., from the detected face. In this case, the processor 1400 may use a well-known image processing technology or a machine learning-based image analysis technology using a deep neural network. For example, the processor 1400 may extract the main feature points of the occupant's face from the occupant image, by performing training using a well-known neural network model, such as an image-based Convolution Neural Network (CNN) or a Recurrent Neural Network (RNN). However, the disclosure is not limited thereto, and the processor 1400 may use all the known feature point extraction technologies. The processor 1400 may obtain 3D location coordinate values of the extracted main feature points, and obtain the occupant location information including at least one of the head location of the occupant or the head rotation direction using the obtained the 3D location coordinate values.

In an embodiment, the internal camera 1120 may include an eye tracking sensor that tracks the gaze of the occupant by capturing occupant's pupils including the driver or the passenger in the passenger seat, and detecting a movement of the pupils. The processor 1400 may obtain information about the gaze direction of the occupant from the eye tracking sensor included in the internal camera 1120.

The electronic device 1000 may measure a distance between the occupant's face and the CMS side display 1310 using the 3D location coordinate values of the main feature points extracted from the occupant image and a location coordinate value of the CMS side display 1310. In the embodiment shown in FIG. 11A, the electronic device 1000 may measure a first distance $d_1$ between the occupant's face and the CMS side display 1310.

The electronic device 1000 may adjust the FoV of the top view image 110 displayed on the CMS side display 1310 based on the measured distance between the occupant's face and the CMS side display 1310. In the embodiment shown in FIG. 11A, when the distance between the occupant's face and the CMS side display 1310 is the first distance $d_1$, the FoV of the top view image 110 may include only the own vehicle image 121 and the first surrounding vehicle image 122.

Referring to FIG. 11B, the occupant (e.g., a driver) may approach the occupant's face in a direction adjacent to the CMS side display 1310 so as to take a closer look at the CMS side display 1310. In this case, the internal camera 1120 may capture the occupant's face in real time, and provide the occupant image obtained through capturing to the processor 1400. The processor 1400 may extract the main feature points of the occupant's face by analyzing the occupant image, obtain the 3D location coordinate values of the extracted main feature points, and measure the changed distance between the occupant's face and the CMS side display 1310 using the obtained 3D location coordinate values of the main feature points and the location coordinate value of the CMS side display 1310. In the embodiment shown in FIG. 11B, the distance between a driver's face and the CMS side display 1310 may be measured as a second distance $d_2$. A value of the second distance $d_2$ may be smaller than the first distance $d_1$ (see FIG. 11A).

The electronic device 1000 may zoom in or out the FoV of a top view image 112 based on a change in the distance value between the occupant's face and the CMS side display 1310. In the embodiment shown in FIG. 11B, when the distance between the driver's face and the CMS side display 1310 is the second distance $d_2$, the top view image 112 displayed on the CMS side display 1310 may display not only the own vehicle image 121 and the first surrounding vehicle image 122 but also a second surrounding vehicle image 126. Referring to FIG. 11A together, when the distance between the occupant (driver)'s face and the CMS side display 1310 is changed from the first distance $d_1$ to the second distance $d_2$, that is, when the occupant (driver) moves the face adjacent to the CMS side display 1310 so as to take a closer look at the CMS side display 1310, the electronic device 1000 may zoom out the top view image 112 displayed on the CMS side display 1310. The top view image 112 shown in FIG. 11B is a zoomed-out image compared to the top view image 110 shown in FIG. 11A, and therefore, the own vehicle image 121 and the first surrounding vehicle image 122 may be displayed on the top view image 112 in a smaller scale than that shown in FIG. 11A.

In the opposite embodiment, that is, when the occupant (driver) moves the face from the CMS side display 1310 to a headrest direction of a vehicle seat, the distance between the occupant (driver)'s face and the CMS side display 1310 may be greater than the second distance $d_2$, and the electronic device 1000 may zoom in the top view image 112.

Figure 12:
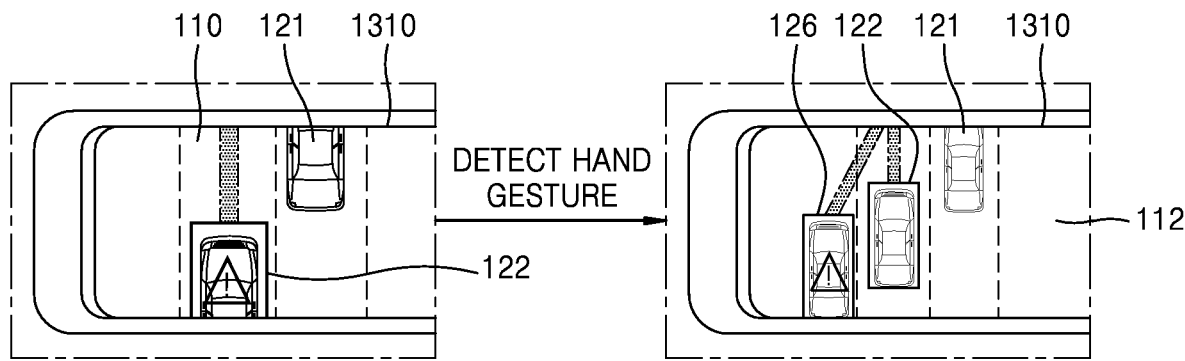
FIG. 12 is a diagram illustrating an embodiment in which an electronic device of the disclosure changes a FoV of an image displayed on a CMS side display based on a hand gesture of an occupant in a vehicle according to an embodiment of the disclosure.

FIG. 12 is a diagram illustrating an embodiment in which an electronic device of the disclosure changes a FoV of an image displayed on a CMS side display based on a hand gesture of an occupant in a vehicle according to an embodiment of the disclosure.

Referring to FIG. 12, the top view image 110 may be displayed on the CMS side display 1310. The own vehicle image 121 and the first surrounding vehicle image 122 may be displayed on the top view image 110.

The electronic device 1000 may detect the hand gesture of the occupant. In an embodiment, the hand gesture input unit 1720 (see FIG. 2) of the electronic device 1000 may receive the hand gesture of a driver or a passenger in a passenger seat including at least one of a pinch in/pinch out or a palm swipe. The processor 1400 (see FIG. 2) may zoom in/out the FoV of the top view image 112 displayed on the CMS side display 1310 based on a hand gesture input received through the hand gesture input unit 1720. For example, when detecting a pinch out input of pinching both fingers, the electronic device 1000 may zoom out the top view image 112 displayed on the CMS side display 1310. In the embodiment shown in FIG. 12, when the top view image 112 is zoomed out, not only the own vehicle image 121 and the first surrounding vehicle image 122 but also the second surrounding vehicle image 126 may be displayed on the top view image 112.

The top view image 112 is a zoomed-out image compared to the top view image 110 displayed on the CMS side display 1310 before the hand gesture is detected, and therefore, the own vehicle image 121 and the first surrounding vehicle image 122 may be displayed on the top view image 112 in a smaller scale than that of the top view image 110 before the hand gesture is detected.

To the contrary, for example, when detecting a pinch-in input of spreading both fingers, the electronic device 1000 may zoom in the top view image 112 displayed on the CMS side display 1310.

For example, the electronic device 1000 may zoom in/out the top view image 112 displayed on the CMS side display 1310 according to a direction of a palm swipe input.

In the embodiments of FIGS. 11A, 11B, and 12, the electronic device 1000 may build an occupant monitoring system (OMS) that detects an action of not only the driver but also the passenger, for example, an action of moving the face adjacent to or away from the CMS side display 1310, or a hand gesture action, and may automatically adjusts the FoV of the top view image 110 displayed on the CMS side display 1310 based on the detected action. The electronic device 1000 of the disclosure may automatically detect needs of the occupant and may provide a related user experience (UX), and thus, the driver may not need to perform a conscious and additional action of manipulating the CMS side display 1310 while driving, and may concentrate on the driving itself, thereby improving convenience. In addition, the driver may omit unnecessary manipulation of the CMS side display 1310 or button manipulation, thereby improving driving stability.

Figure 13:
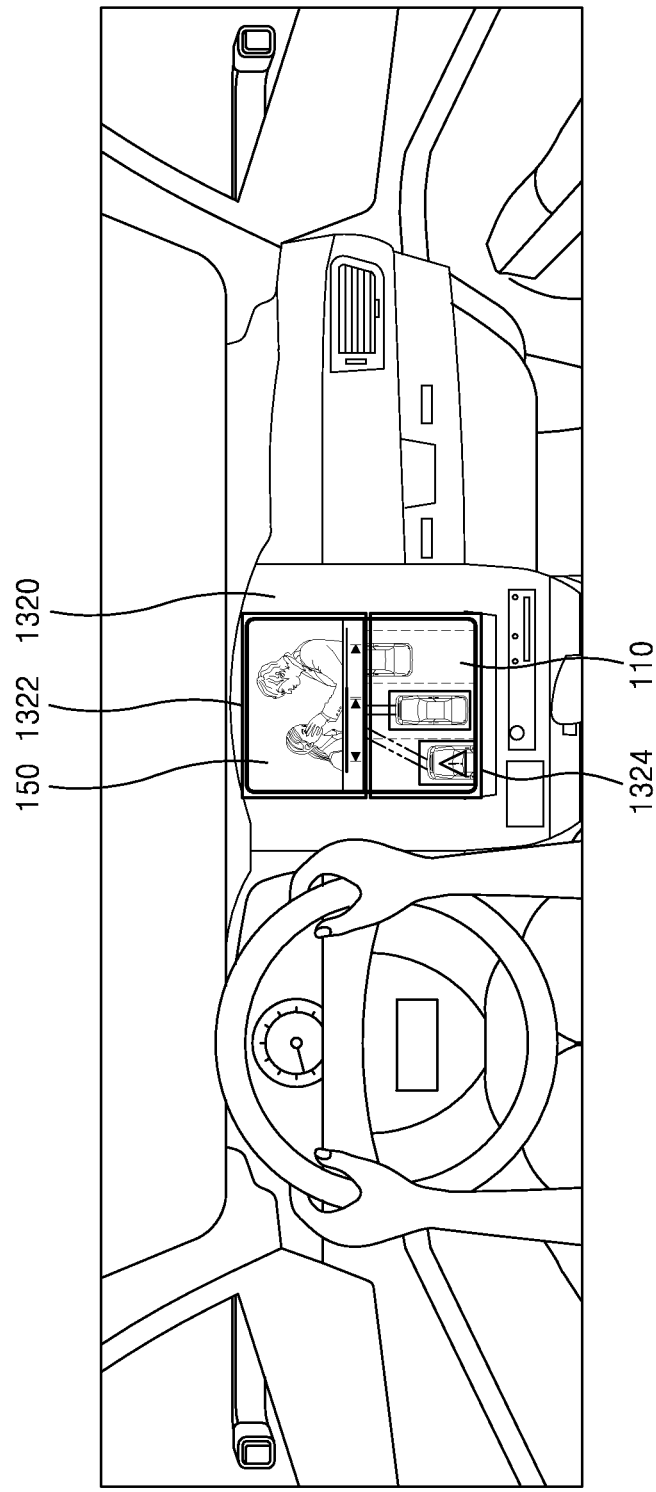
FIG. 13 is a diagram illustrating an embodiment in which an electronic device of the disclosure displays a top view image on a center information display (CID) according to an embodiment of the disclosure.

FIG. 13 is a diagram illustrating an embodiment in which an electronic device of the disclosure displays a top view image on a CID according to an embodiment of the disclosure.

Referring to FIG. 13, the CID 1320 may display the top view image 110 and an image content 150. In an embodiment, the CID 1320 may split into a first region 1322 and a second region 1324, the image content 150 may be displayed on the first region 1322, and the top view image 110 may be displayed on the second region 1324. The image content 150 may include, for example, at least one of a movie, a television (TV) show, Internet-based video streaming (e.g., YouTube or Netflix), or a game.

In the embodiment shown in FIG. 13, when a vehicle is driving in an autonomous driving mode, the CID 1320 may display the image content 150 that an occupant may enjoy and simultaneously display the top view image 110 on a CMS side display together, so that a driver may predict a determination of the vehicle itself and an autonomous driving method in a lane change or turn situation, etc., thereby providing high reliability regarding autonomous driving to the driver or a passenger.

Figure 14A:
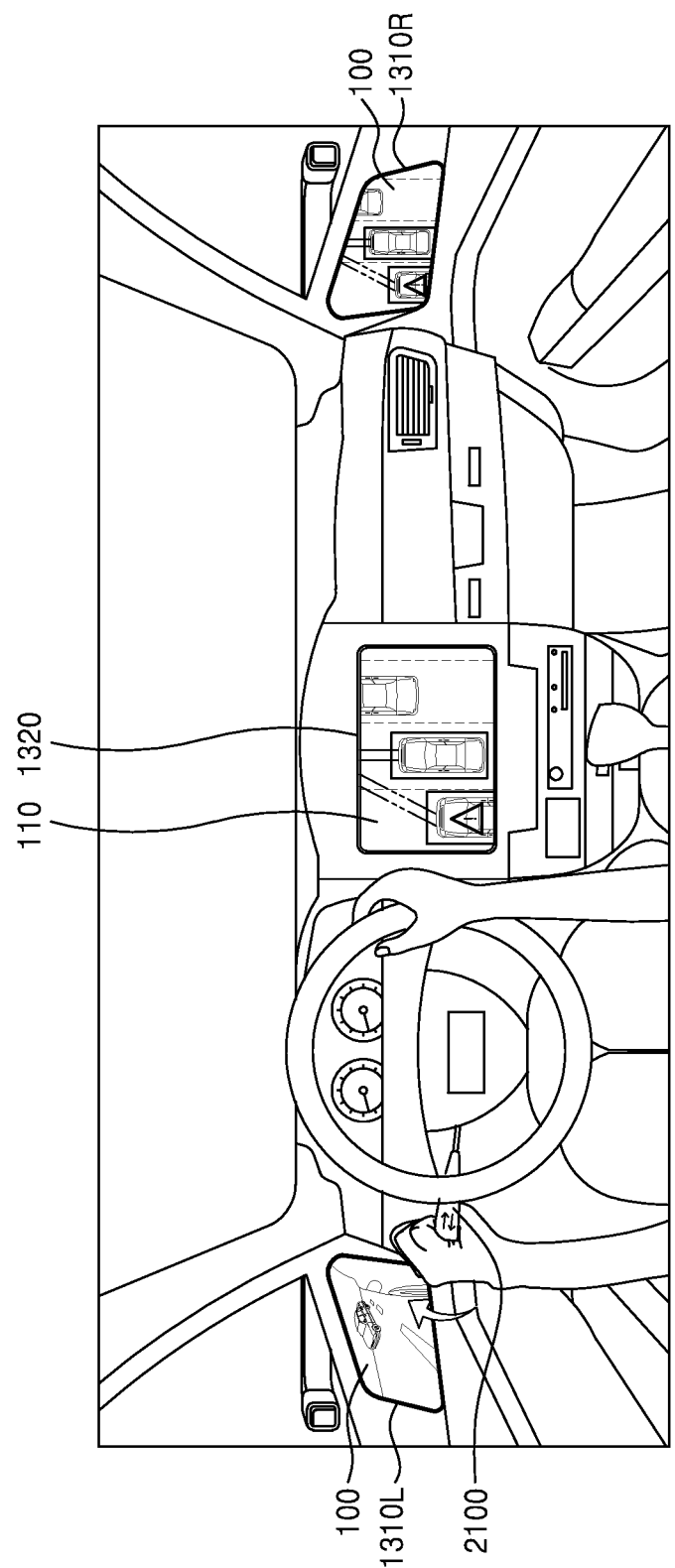
FIG. 14A is a diagram illustrating an embodiment in which an electronic device of the disclosure displays a top view image on a CMS side display and a CID in the case of a left-hand drive (LHD) vehicle according to an embodiment of the disclosure.

FIG. 14A is a diagram illustrating an embodiment in which an electronic device of the disclosure displays a top view image on a CMS side display and a CID in the case of left-hand drive (LHD) vehicle according to an embodiment of the disclosure.

Figure 14B:
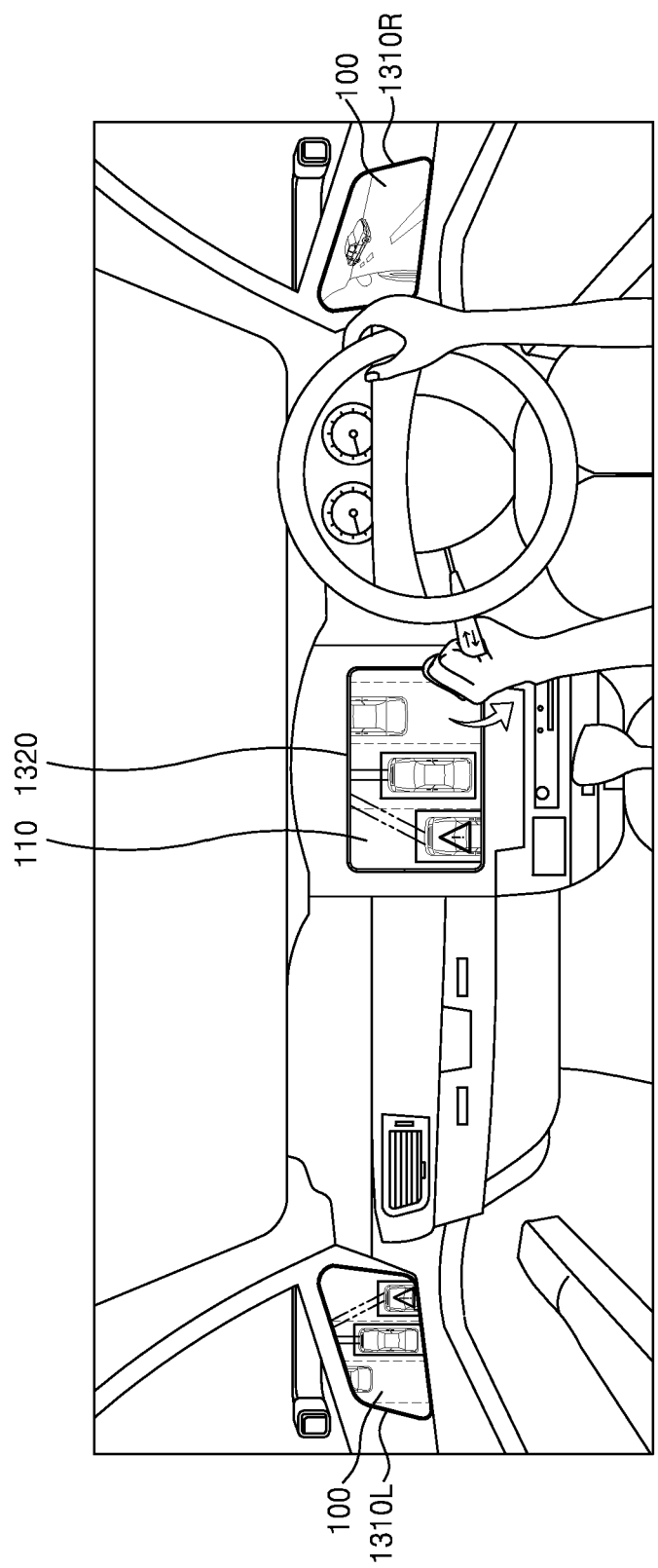
FIG. 14B is a diagram illustrating an embodiment in which an electronic device of the disclosure displays a top view image on a CMS side display and a CID in the case of a right-hand drive (RHD) vehicle according to an embodiment of the disclosure.

FIG. 14B is a diagram illustrating an embodiment in which an electronic device of the disclosure displays a top view image on a CMS side display and a CID 1320 in the case of a right-hand drive (RHD) vehicle according to an embodiment of the disclosure.

Types of vehicles may be classified into the LHD vehicle and the RHD vehicle according to a location of a steering wheel. The type of vehicle may vary depending on a road. For example, in a country (e.g., S. Korea or the United States) that has adopted a traffic system in which vehicles run on the right side of the road, the LHD vehicle with the steering wheel located on the left is used, and in a country (e.g., Japan or UK) that has adopted a traffic system in which vehicles run on the left side of the road, the RHD vehicle with the steering wheel located on the right is used.

Referring to FIG. 14A, when the LHD vehicle turns a driving direction to the right or attempts to change a lane to a right lane with respect to the vehicle, the vehicle may receive an input activating (lighting) a right turn signal by manipulating the turn signal lever 2100 by the driver. When the right turn signal is activated, the electronic device 1000 may receive turn signal activation information from the vehicle sensor module 2000 (see FIG. 3), and may switch a surrounding environment image displayed on the right CMS side display 1310R to the top view image 110 based on the received turn signal activation information. In this case, the electronic device 1000 may display the top view image 110 not only on the right CMS side display 1310R but also on the CID 1320.

When the driver manipulates (lights) a left turn signal by manipulating the turn signal lever 2100, the electronic device 1000 may switch the surrounding environment image 100 displayed on the left CMS side display 1310L to the top view image 110. However, in this case, the top view image 110 may not be displayed on the CID 1320.

Referring to FIG. 14B, when the RHD vehicle turns the driving direction to the left or attempts to change a lane to a left lane with respect to the vehicle, the vehicle may receive an input activating (lighting) a left turn signal by manipulating the turn signal lever 2100 by the driver. When the left turn signal is activated, the electronic device 1000 may receive turn signal activation information from the vehicle sensor module 2000 (see FIG. 3), and may switch a surrounding environment image displayed on the left CMS side display 1310L to the top view image 110 based on the received turn signal activation information. In this case, the electronic device 1000 may display the top view image 110 not only on the left CMS side display 1310L but also on the CID 1320.

When the driver manipulates (lights) the right turn signal by manipulating the turn signal lever 2100, the electronic device 1000 may switch the surrounding environment image 100 displayed on the right CMS side display 1310R to the top view image 110. However, in this case, the top view image 110 may not be displayed on the CID 1320.

In the embodiments shown in FIGS. 14A and 14B, the CMS side display located adjacent to the driver among the left CMS side display 1310L and the right CMS side display 1310R is different according to whether the vehicle type is the LHD vehicle or the RHD vehicle. For example, in the case of the LHD vehicle, the left CMS side display 1310L is disposed adjacent to a location of the driver, but the right CMS side display 1310R is disposed relatively far from the location of the driver. Accordingly, the driver needs an additional action to rotate the face or turn a gaze direction to the right to view the right CMS side display 1310R, and in this case, concentration may be dispersed. Although it does not matter while the driver stops the vehicle, but there is a risk of an accident occurring when concentration is lowered to view the right CMS side display 1310R while driving or when changing lanes. In the case of the LHD vehicle, when the right turn signal is activated, the electronic device 1000 may display the top view image 110 not only on the CID 1320 but also the right CMS side display 1310R, and therefore, the additional action of the driver may be omitted, thereby improving driving stability. In the case of the RHD vehicle, only the direction of the turn signal is different, but the principle of operation is the same.

A program executed by the electronic device 1000 described in the specification may be implemented by hardware components, software components, and/or a combination of hardware components and software components. The program may be performed by all systems capable of performing computer-readable instructions.

Software may include a computer program, code, instructions, or a combination thereof, and constitute a processing device so as to operate as desired, or independently or collectively command the processing device.

The software may be implemented by a computer program including instructions stored in computer-readable storage media. Examples of the computer-readable storage media may include magnetic storage media (e.g., ROM, RAM, floppy disks, hard disks, etc.) and optical recording media (e.g., CD-ROMs, digital versatile discs (DVDs), etc.). The computer-readable storage media may be distributed over network coupled computer systems so that the computer-readable code is stored and executed in a distributed fashion. The media may be read by a computer, stored in a memory, and executed by a processor.

The computer-readable storage media may be provided in the form of non-transitory storage media. Herein, the term 'non-transitory' merely indicates that a storage medium is tangible without including a signal, and does not discriminate whether data is semipermanently or temporarily stored in a storage medium.

In addition, the program according to the embodiments of the specification may be provided by being included in a computer program product. The computer program product may be traded between a seller and a purchaser.

The computer program product may include a software program or a non-transitory computer-readable storage medium in which the software program is stored. For example, the computer program product may include a software program form of product (e.g., a downloadable application) electronically distributed through a manufacturing company of the electronic device or an electronic market (e.g., Google PlayStore™, or App Store™). For the electronic distribution, at least a portion of the software program may be stored in a storage medium or temporarily generated. In this case, the storage medium may be included in a server of the manufacturing company of a vehicle or the electronic device 1000, a server of the electronic market, or a proxy server configured to temporarily store the software program.

The computer program product may include a storage medium of a server or a storage medium of a device in a system including the electronic device 1000, the server and the other device. Alternatively, when a third device (e.g., a smartphone) communicatively connected to the electronic device 1000 exists, the computer program product may include a storage medium of the third device. Alternatively, the computer program product may include the software program to be transmitted from the electronic device 1000 to the device or the third device or transmitted from the third device to the device.

In this case, one of the electronic device 1000, the device, and the third device may execute the computer program product and perform the methods according to the embodiments of the disclosure. Alternatively, two or more of the electronic device 1000, the device, and the third device may execute the computer program product and perform the methods according to the embodiments of the disclosure in a distributed fashion.

For example, the electronic device 1000 may execute the computer program product stored in the memory (1500 see FIG. 2) to control the other device communicatively connected to the electronic device 1000 to perform the methods according to the embodiments of the disclosure.

For another example, the third device may execute the computer program product to control a device communicatively connected to the third device to perform the method according to the embodiment of the disclosure.

When the third device executes the computer program product, the third device may download the computer program product from the electronic device 1000 and execute the downloaded computer program product. Alternatively, the third device may execute the computer program product provided in a pre-loaded state to perform the methods according to the embodiments of the disclosure.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. A method, performed by an electronic device installed in a vehicle, of displaying an image by using a camera monitoring system (CMS) of the vehicle, the method comprising:
    displaying, on a CMS side display, a first image that is a surrounding environment image obtained by capturing a left surrounding environment or a right surrounding environment of the vehicle by using an external camera system disposed on a side surface of the vehicle;
    detecting a lane change signal of the vehicle;
    in response to the detected lane change signal, switching the first image displayed on the CMS side display to a second image that is a top view image showing locations of the vehicle and a surrounding vehicle in a virtual image as looking down from above the vehicle;
    reducing a size of the first image;
    displaying the reduced first image and the second image by overlaying the reduced first image on the second image; and
    displaying, on the second image, a lane change user interface (UI) indicating information about whether a lane change is possible.

2. The method of claim 1, wherein the detecting of the lane change signal comprises detecting a user input for lighting a turn signal, by the user input comprising a manipulation of a turn signal lever of the vehicle.

3. The method of claim 1, wherein the detecting of the lane change signal comprises detecting one of a turn or a lane change based on driving route information of a navigation system of the vehicle.

4. The method of claim 1, wherein the displaying of the lane change UI indicating information about whether the lane change is possible comprises displaying a UI related to driving environment information comprising at least one of a lane, a location of a surrounding vehicle, a relative speed between the vehicle and the surrounding vehicle, a distance between the vehicle and the surrounding vehicle, or an expected entry route of each of the vehicle and the surrounding vehicle detected from the surrounding environment image.

5. The method of claim 1, further comprising:
    detecting a lane departure based on the vehicle departing from a first lane on which the vehicle is currently driving and entering a second lane which is a lane to be entered by a preset range;
    in response to the detected lane departure, switching the second image displayed on the CMS side display to a third image comprising only a top view image excluding the overlaid surrounding environment image in the second image; and
    displaying the third image on the CMS side display.

6. The method of claim 1, further comprising:
    obtaining an occupant image by using a camera mounted inside the vehicle;
    obtaining location information about an occupant, comprising at least one of a head location, a head rotation direction, or a gaze direction of the occupant from the obtained occupant image;
    measuring a distance between the occupant and the CMS side display based on the obtained location information of the occupant; and
    zooming in or out a field of view (FoV) of the second image based on the measured distance.

7. A non-transitory computer-readable recording medium recording thereon at least one program for implementing the method according to claim 1.

8. An electronic device configured to display an image using a camera monitoring system (CMS) of a vehicle, the electronic device comprising:
    a first external camera disposed on a left side surface of an outside of the vehicle and a second external camera disposed on a right side surface of the outside of the vehicle, wherein the first external camera and the second external camera are configured to:
    capture a surrounding environment of the vehicle, and
    obtain a first image that is a surrounding environment image;
    a CMS side display disposed inside the vehicle displaying the surrounding environment image;
    a memory storing a program comprising one or more instructions controlling the electronic device; and
    at least one processor configured to execute the one or more instructions of the program stored in the memory,
    wherein the processor is further configured to:
        detect a lane change signal of the vehicle,
        in response to the detected lane change signal:
        switch the first image displayed on the CMS side display to a second image that is a top view image showing locations of the vehicle and a surrounding vehicle in a virtual image as looking down from above the vehicle,
        reduce a size of the first image,
        control the CMS side display to display the first image and the second image by overlaying the reduced first image on the second image, and
        display a lane change user interface (UI) indicating information about whether a lane change is possible on the second image.

9. The electronic device of claim 8, wherein the processor is further configured to:
    detect a user input for lighting a turn signal, the user input comprising a manipulation of a turn signal lever of the vehicle, and
    switch the first image displayed on the CMS side display to the second image based on the user input.

10. The electronic device of claim 8, wherein the processor is further configured to display a UI related to driving environment information comprising at least one of a lane, a location of a surrounding vehicle, a relative speed between the vehicle and the surrounding vehicle, a distance between the vehicle and the surrounding vehicle, or an expected entry route of each of the vehicle and the surrounding vehicle detected from the surrounding environment image on the CMS side display.

11. The electronic device of claim 8,
    wherein the processor is further configured to detect a lane departure that the vehicle departs from a first lane on which the vehicle is currently driving and enters a second lane which is a lane to be entered by a preset range, and
    wherein in response to the detected lane departure:
        switch the second image displayed on the CMS side display to a third image comprising only a top view image excluding the overlaid surrounding environment image, and
        control the CMS side display to display the third image.

12. The electronic device of claim 8, further comprising:
    an internal camera mounted inside the vehicle and configured to obtain an occupant image by capturing an occupant, wherein the processor is further configured to:
- obtain location information of the occupant comprising at least one of a head location, a head rotation direction, or a gaze direction of the occupant from the occupant image,
- measure a distance between a driver and the CMS side display based on the obtained location information of the occupant, and
- zoom in or out a field of view (FoV) of the second image based on the measured distance.

13. The electronic device of claim 8, further comprising:
a center information display (CID) disposed on a dashboard of the vehicle,
wherein the processor is further configured to display the second image on the CMS side display and the CID.

* * * * *